(12) United States Patent
Hoshino et al.

(10) Patent No.: US 7,440,241 B2
(45) Date of Patent: Oct. 21, 2008

(54) MAGNETORESISTIVE HEAD USING LONGITUDINAL BIASING METHOD WITH 90-DEGREE MAGNETIC INTERLAYER COUPLING AND MANUFACTURING METHOD THEREOF

(75) Inventors: Katsumi Hoshino, Kanagawa (JP);
Hiroyuki Hoshiya, Kanagawa (JP);
Hiroyuki Katada, Kanagawa (JP);
Kenichi Meguro, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 477 days.

(21) Appl. No.: 11/243,298

(22) Filed: Oct. 3, 2005

(65) Prior Publication Data

US 2006/0103991 A1 May 18, 2006

(30) Foreign Application Priority Data

Nov. 15, 2004 (JP) ............................. 2004-330636

(51) Int. Cl.
*G11B 5/39* (2006.01)
(52) U.S. Cl. ................................. 360/324.12
(58) Field of Classification Search ................ None
See application file for complete search history.

(56) References Cited

U.S. PATENT DOCUMENTS

| 6,473,279 | B2 * | 10/2002 | Smith et al. | 360/324.12 |
| 6,621,664 | B1 * | 9/2003 | Trindade et al. | 360/318 |
| 6,765,770 | B2 * | 7/2004 | Dee | 360/324.12 |
| 7,106,561 | B2 * | 9/2006 | Carey et al. | 360/324.12 |
| 7,242,556 | B2 * | 7/2007 | Gill | 360/324.12 |
| 2002/0159201 | A1 * | 10/2002 | Li et al. | 360/324.1 |

FOREIGN PATENT DOCUMENTS

| JP | 04-358310 A | 12/1992 |
| JP | 07-057223 A | 3/1995 |
| JP | 2001-160640 A | 6/2001 |
| JP | 2001-250205 A | 9/2001 |
| JP | 2002-367124 A | 12/2002 |

* cited by examiner

*Primary Examiner*—Angel A Castro
(74) *Attorney, Agent, or Firm*—Townsend and Townsend and Crew LLP; Rambod Nader

(57) ABSTRACT

A magnetoresistive head and a fabricating method thereof accomplishing high read sensitivity and excellent linear response with low noise even if track width narrowing makes progress are provided. In one embodiment, using a magnetoresistive film having a laminated body of a pinned layer/an intermediate layer/a free layer/a separate layer/a first ferromagnetic layer/a 90-degree magnetic interlayer coupling layer/a second ferromagnetic layer, and the magnetizations of both the pinned layer and the second ferromagnetic layer are fixed nearly in the direction along the sensor height. On the other hand, the magnetizations of the first ferromagnetic layer and the second ferromagnetic layer have an interlayer interaction being directed in nearly orthogonal directions to each other through the 90-degree magnetic interlayer coupling layer, and the first ferromagnetic layer has a magnetization directed nearly in the direction along the track width in zero external magnetic field. According to this, the first ferromagnetic layer applies a longitudinal biasing field to the free layer nearly in the direction along the track width.

15 Claims, 12 Drawing Sheets

Fig.3
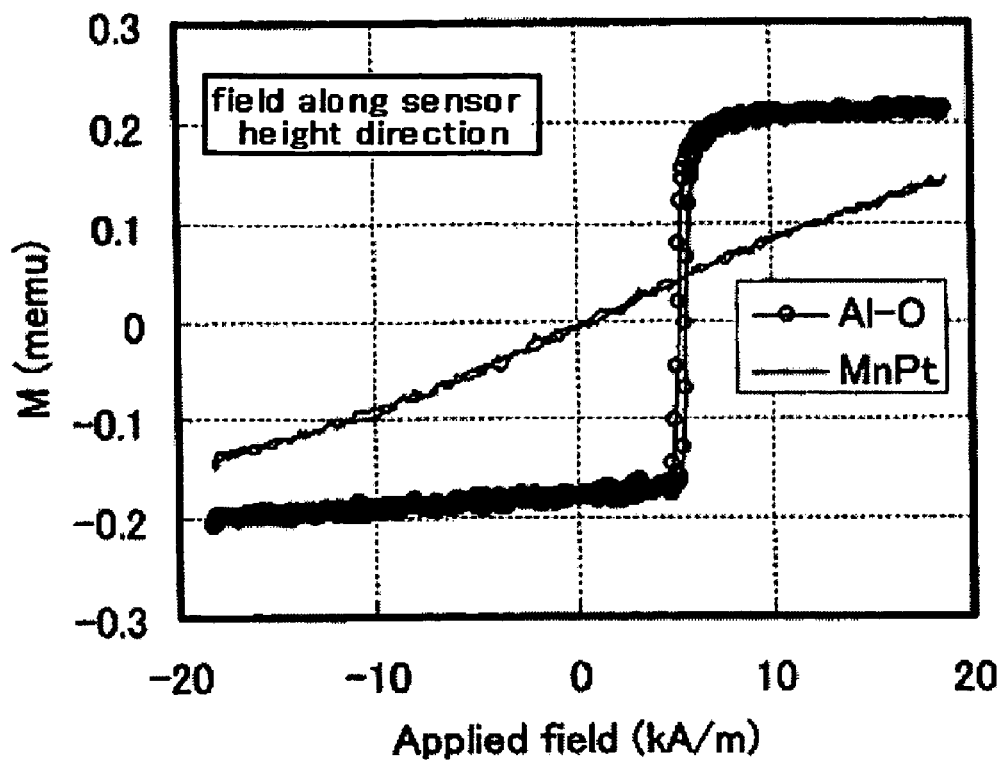
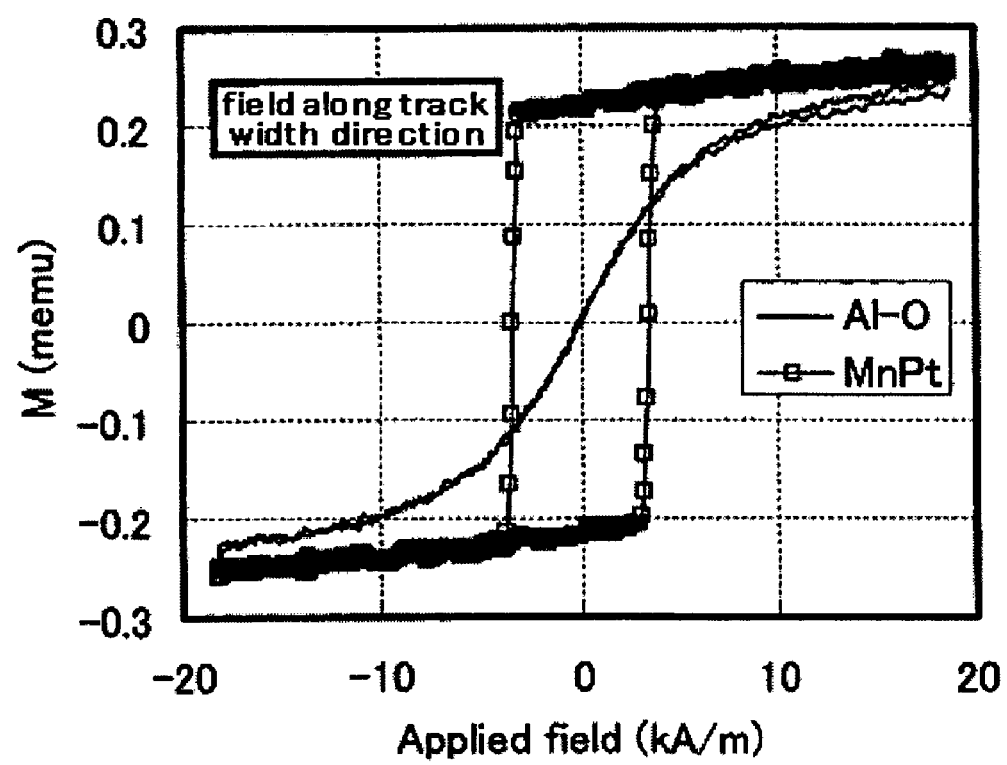

Fig.8
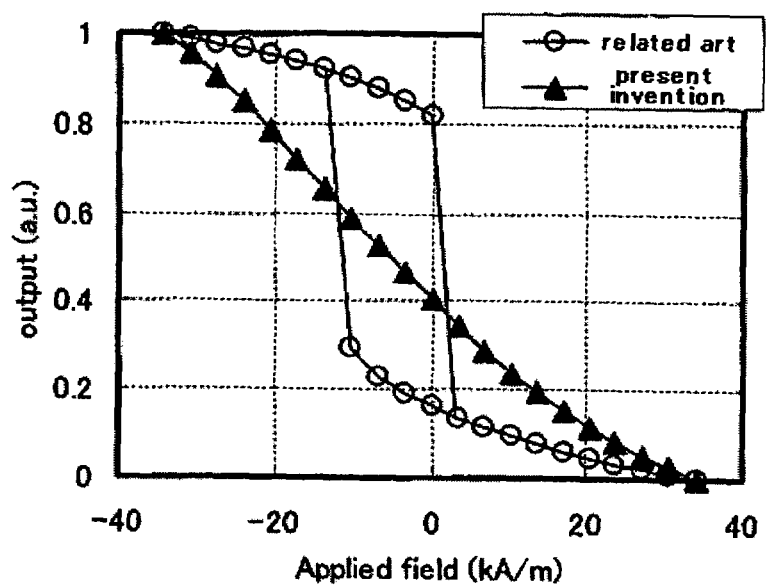
related art
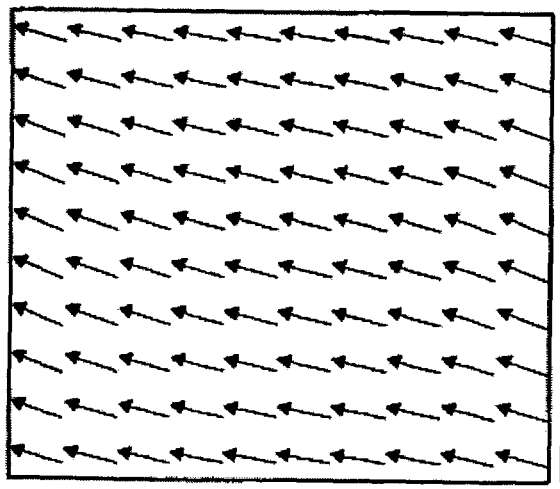
present invention
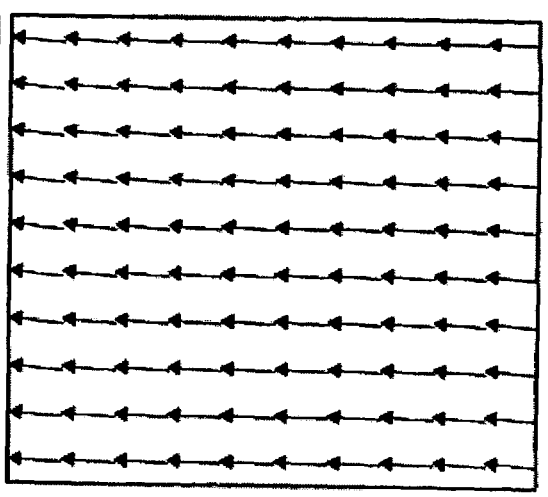

Fig. 12
(A) in case of containing first or second antiferromagnetic layer
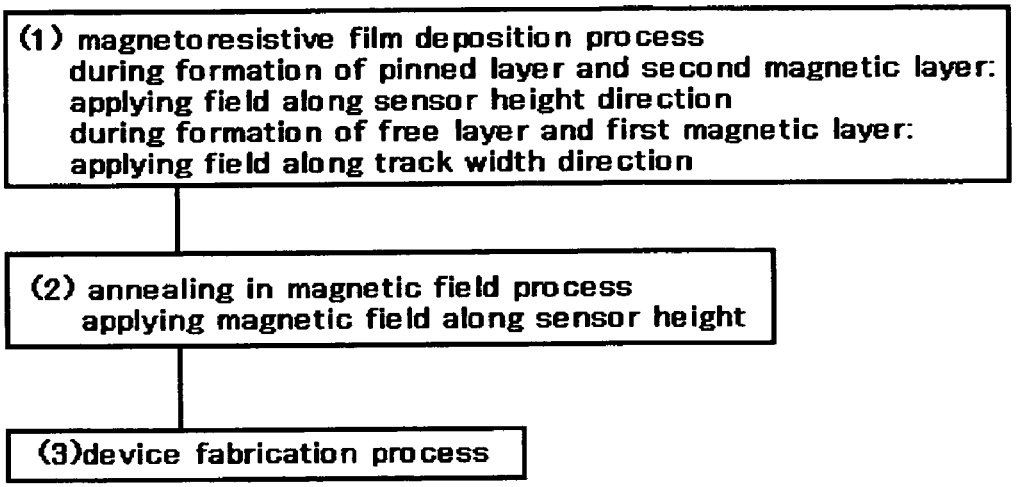
(B) in case of not containing first nor second antiferromagnetic layer
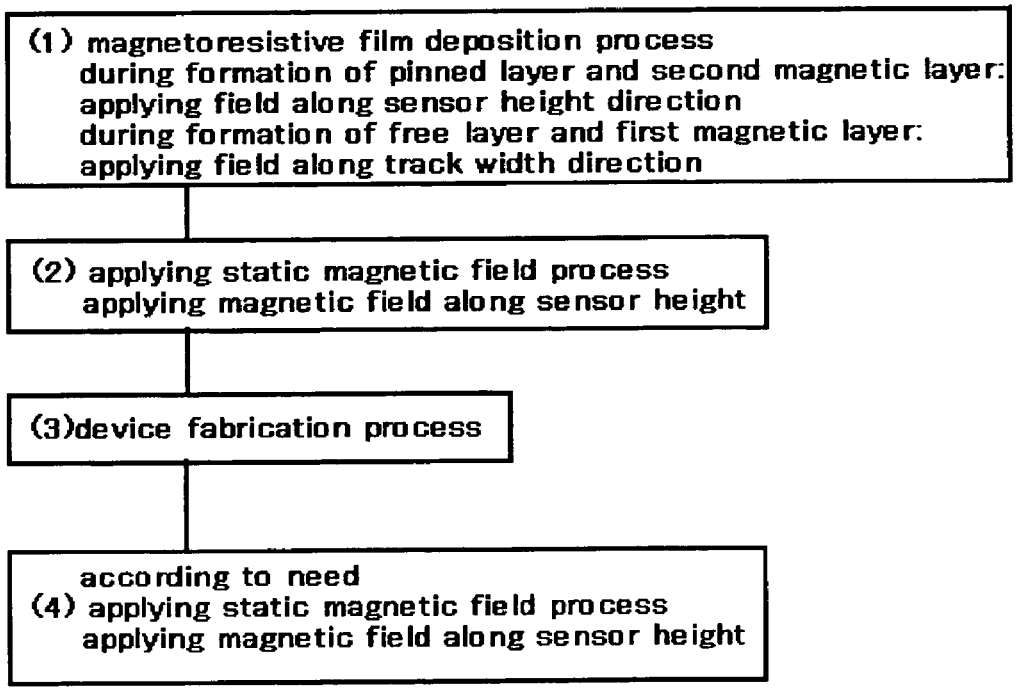

air-bearing surface

MAGNETORESISTIVE HEAD USING LONGITUDINAL BIASING METHOD WITH 90-DEGREE MAGNETIC INTERLAYER COUPLING AND MANUFACTURING METHOD THEREOF

CROSS-REFERENCES TO RELATED APPLICATIONS

This application claims priority from Japanese Patent Application No. JP2004-330636, filed Nov. 15, 2004, the entire disclosure of which is incorporation herein by reference.

BACKGROUND OF THE INVENTION

The present invention relates to a magnetoresistive head mounted in a magnetic recording system. Particularly, it relates to a magnetoresistive head and a manufacturing method thereof by which information recorded in a magnetic medium is reproduced.

At the present time, a GMR (Giant Magneto-Resistive) head using a spin-valve, which has a basic structure consisting of a ferromagnetic layer/nonmagnetic conductive layer/ferromagnetic layer/antiferromagnetic layer disclosed in JP-A No. 358310/1992, is generally adopted for a magnetoresistive head mounted in a magnetic recording system as a read sensor. In a spin-valve, a ferromagnetic layer in which the magnetization direction is fixed in one direction by a magnetic exchange coupling with an antiferromagnetic layer is called a pinned layer, and another ferromagnetic layer is called a free layer because the magnetization direction can be freely changed according to an external magnetic field.

A GMR head using a spin-valve outputs a magnetic signal as a voltage change or a current change by using a phenomenon in which the electrical resistivity changes in proportion to the angle made by the magnetizations of the pinned layer and the free layer. Therefore, fixing the magnetization direction of the pinned layer unidirectionally (concretely, a direction perpendicular to the magnetic medium, hereinafter, it is written as "sensor height direction") becomes most important in making the spin-valve function as a magnetic sensor. That is, it is necessary that the magnetic field needed to reverse the magnetization of the pinned layer (which corresponds to the magnetic exchange coupling field applied by the antiferromagnetic layer) is made sufficiently greater than a signal field from the magnetic medium and a leakage field from the write head, etc. Moreover, concerning the thermal history while manufacturing the magnetoresistive head and the operation environmental temperature of head, etc., the thermal stability of the magnetic exchange coupling field applied from the antiferromagnetic film to the pinned layer becomes an important factor.

At the present time, in mainstream use for the antiferromagnetic layer is an alloy expressed by Mn-$M_1$ (where $M_1$ is a noble metal such as Pt, etc.) including Mn of about 50 at % for the reason that a large magnetic exchange coupling field can be obtained and the thermal stability is excellent. These materials do not apply a magnetic exchange coupling field to the pinned layer as deposited on the spin-valve. Because of this, a Mn-$M_1$ alloy is a disordered alloy having an fcc structure right after film deposition and it does not exhibit antiferromagnetism. In order to apply a magnetic exchange coupling field to the pinned layer, it is generally necessary to perform annealing in a magnetic field. It is known that a Mn-$M_1$ alloy phase transforms into an ordered alloy having a Cu—Au I-type structure and exhibits antiferromagnetism by performing annealing at a temperature around from 230 to 270° C. Moreover, in the case when this annealing is carried out in a magnetic field, the pinned layer is magnetically exchange coupled unidirectionally with the antiferromagnetic layer, and the magnetization direction can be fixed. That is, in the case when a Mn-$M_1$ alloy is used for the antiferromagnetic layer, an in-field annealing process is necessary not only to give a large magnetic exchange coupling field and excellent thermal stability to the pinned layer, but also to fix the magnetization direction to the pinned layer.

On the other hand, in order to obtain symmetrical response properties against the code of the signal field, it is necessary that the magnetization of the free layer is directed toward the track width direction under the condition that the external magnetic field is zero. Moreover, in order to obtain less noise and excellent linear response properties, it is necessary to apply a longitudinal biasing field to the free layer in the direction along the track width so that the free layer has a single magnetic domain structure. As a means for applying the longitudinal biasing field, JP-A No. 57223/1995 discloses a means for making a single magnetic domain in which a hard magnetic material or a laminated layer of ferromagnetic layer and antiferromagnetic layer is placed on both ends of the spin-valve and a longitudinal biasing field is applied to the free layer. Particularly, the former one is called a hard bias structure and it has become the mainstream of current GMR head structures. A hard bias structure makes the free layer single magnetic domain, so that it is effective in suppressing noise. However, in the case when the longitudinal biasing field is too high, the reproducing output becomes smaller. On the other hand, in the case when the longitudinal biasing field is too low, the problem arises that a single magnetic domain effect cannot be sufficiently obtained. Therefore, excellent reproducing properties cannot be obtained unless the magnitude of the longitudinal biasing field is optimized.

In a hard bias structure, controlling the magnitude of the longitudinal biasing field is extremely difficult because it is being decided while many factors are influencing each other in a complicatedly way, which are (1) the magnetic moment ratio of the free layer and the hard magnetic film, (2) the etching shape of the spin-valve at the track edges, (3) the geometric arrangement of the hard magnetic film in relation to the free layer, and so on. Moreover, because the hard magnetic film is so arranged, a so-called "side-reading" problem arises since the shield to shield spacing between the upper and lower shields at the track edges becomes larger than at the mid-position of the track, whereby, the effective magnetic track width does not become narrow even if the geometric track width is made narrower, and a further increase in the recording density cannot be achieved. It is clear that these problems become noticeable with narrowing the track width.

As another means of applying the longitudinal biasing field to the free layer, JP-A No. 250205/2001 discloses a means for depositing an in-stack bias film consisting of a laminated film of a bias antiferromagnetic layer/bias ferromagnetic layer/bias antiferromagnetic layer connected to the free layer after depositing a spin-valve consisting of an antiferromagnetic layer/nonmagnetic conductive layer/free layer. In this configuration, the magnetization direction of the bias ferromagnetic layer is fixed by magnetic exchange coupling with the bias antiferromagnetic layer in the direction along the track width. Moreover, a longitudinal biasing field can be applied effectively to the free layer by coupling the free layer with the bias ferromagnetic layer ferromagnetically or antiferromagnetically through the bias nonmagnetic layer (hereinafter, this means for applying a longitudinal biasing field is called an "in-stack bias structure"). In this case, an advantage is expected that the magnitude of the longitudinal biasing field can be easily controlled by controlling the thickness of the bias nonmagnetic layer.

However, in this configuration, it is very difficult to control the magnetizations of the pinned layer and the bias ferromagnetic layer in the direction along the sensor height and track width direction, respectively. That is, because the first in-field annealing process to fix the magnetization of the pinned layer in the direction along the sensor height and the second in-field annealing process to fix the magnetization of the bias ferromagnetic layer in the direction along the track width are needed, a problem arises that the in-field annealing processes affect each other and the magnetization directions of the pinned layer and of the bias ferromagnetic layer are shifted from their desired directions. JP-A No. 367124/2002 discloses that the above-mentioned magnetization direction control is carried out by using antiferromagnetic layers having different blocking temperatures and by performing in-field annealing applied in the direction along the sensor height and in the direction along the track width at different temperatures. However, in this method, it is necessary to trade off the magnitude of the magnetic exchange coupling field and the thermal stability given to either of the two above-mentioned ferromagnetic layers. In this case, there is a possibility that it becomes very difficult to obtain reproducing properties with excellent reliability.

JP-A No. 160640/2001 discloses that 90-degree magnetic interlayer coupling is used for the above-mentioned magnetic direction control method. In this specification, the interlayer interaction, in which adjoining ferromagnetic layers are directed in nearly orthogonal directions to each other through the magnetic separate layer, is called "90-degree magnetic interlayer coupling". This disclosure example has a laminated structure of first antiferromagnetic layer/pinned layer/nonmagnetic conductive layer/free layer/90-degree magnetic interlayer coupling layer/bias ferromagnetic layer/second antiferromagnetic layer, and the magnetization directions of the pinned layer and the bias ferromagnetic layer are both fixed in the direction along the sensor height. That is, the annealing to fix the magnetization direction needs only be carried out while applying a magnetic field in the direction along the sensor height. In this case, the magnetization of the free layer can be automatically directed in the direction along the track width because an interlayer interaction is working where the magnetizations of the free layer and the bias ferromagnetic layer are directed in orthogonal directions to each other through the 90-degree magnetic interlayer coupling layer. However, in this configuration, there is a concern that magnetic poles are created at the track edges of the free layer, and making a single magnetic domain is prevented because of the influence of a demagnetizing field.

BRIEF SUMMARY OF THE INVENTION

With improving the areal recording density of a magnetic recording system in the future, the track width becomes narrower. Because of this, according to the reasons described above, it is expected that realizing high read sensitivity compatible with excellent linear response properties with low noise will become difficult. In the currently proposed in-stack biasing structure as a means of applying an alternate longitudinal biasing field in a hard bias structure, there is concern that control of the magnetization direction of the layer applying a longitudinal biasing field to the pinned layer and the free layer is difficult, and making a single magnetic domain is prevented by the influence of a demagnetizing field because of creation of magnetic poles at the track edges of the free layer.

It is a feature of the present invention to provide a mechanism for easily controlling the magnetization direction of the ferromagnetic layer applying a longitudinal biasing field to the pinned layer and the free layer and for controlling the influence of the demagnetizing field at the track edges of the free layer in a magnetoresistive head having an in-stack biasing structure.

The basic structure of a magnetoresistive film of the present invention includes a laminated body of a pinned layer/intermediate layer/free layer/separate layer/first ferromagnetic layer/90-degree magnetic interlayer coupling layer/second ferromagnetic layer. Even if the pinned layer is on the side close to the substrate and the second ferromagnetic layer is on the side close to the substrate, the lamination order does not run counter to the spirit of this invention. Herein, the magnetizations of both the pinned layer and the second ferromagnetic layer are fixed nearly in the direction along the sensor height. On the other hand, the magnetizations of the first ferromagnetic layer and the second ferromagnetic layer have a mutually orthogonal interlayer interaction through the 90-degree magnetic interlayer coupling layer, and the first ferromagnetic layer has a magnetization nearly in the direction along the track width under the condition that the external magnetic field is zero. Because of this, the first ferromagnetic layer can apply a longitudinal biasing field to the free layer nearly in the direction along the track width. That is, the first ferromagnetic layer is coupled magnetostatically to the free layer at the track edges, and a longitudinal biasing field is applied to the free layer nearly parallel to the track width direction by returning the magnetic flux. Moreover, it is preferable that the material and film thickness of the separate layer are selected to make the free layer and the first ferromagnetic layer interlayer-couple antiferromagnetically through the separate layer, thereby promoting the efficacy of the aforementioned applied longitudinal biasing field. The reason is that the longitudinal biasing field causing the magnetostatic coupling at the track edges and the longitudinal biasing field causing the antiferromagnetic interlayer coupling through the separate layer have the same direction. As a separate layer which creates the antiferromagnetic interlayer coupling, one can use a metallic material selected from Cr, Cu, Ru, Rh, Pd, Re, Ir, and Au, etc., and an alloy and a laminated film of these materials. However, when the antiferromagnetic interlayer coupling between the free layer and first ferromagnetic layer is made too strong, a problem arises that the output is decreased because the magnetization of the free layer becomes difficult to rotate by the signal field of the medium. It is possible that the strength of the antiferromagnetic interlayer coupling can be controlled at will by making the separate layer multi-layer and increasing the film thickness, etc.

A magnetic interlayer interaction working in nearly orthogonal directions is called "90-degree magnetic interlayer coupling" in this specification, but, in the key points of the present invention, the effects are not destroyed even if the direction of the magnetic interlayer interaction has some distribution in a range of about 85 to 95 degrees.

It is preferable that the second ferromagnetic layer has at least two ferromagnetic layers, and the aforementioned ferromagnetic layers have so-called "synthetic ferromagnetic" structures in which these layers are laminated through an antiferromagnetic coupling layer. The magnetization of the second ferromagnetic layer is fixed in the direction along the sensor height, so that an in-plane biasing field is applied to the free layer proportional to the magnetic moment. Therefore, it is preferable that the second ferromagnetic layer has a synthetic ferromagnetic structure, and the effective magnetic moment of the second ferromagnetic layer is reduced.

The 90-degree magnetic interlayer coupling layer is composed of a material expressed by Mn—X (X is at least one element selected from the group of Cr, Fe, Co, Ni, Ru, Rh, Pd, Re, Os, Ir, and Pt). Particularly, it is preferable that it is a Mn—Pt and the film thickness is about 1 nm or more and about 2.5 nm or less because a large perpendicular interlayer coupling field can be obtained. An oxide layer containing Cr, Mn, or at least one element selected from the group of {Mg, Ca, Cr, Mn, Fe, and Co} may be used as another material for the 90-degree magnetic interlayer coupling layer, and similar functionality can be obtained.

As a mechanism for fixing the magnetization of the pinned layer nearly in the direction along the sensor height, an magnetic exchange coupling with the first antiferromagnetic layer formed on the face of the side opposite to the intermediate layer and connected to the pinned layer may be used, and a so-called "self pinned" structure may be used in which the first antiferromagnetic layer is not formed on the face of the side opposite to the pinned layer connected to the pinned layer, the pinned layer has at least two ferromagnetic layers, and the ferromagnetic layers are laminated to each other through the antiferromagnetic coupling layer. Moreover, the pinned layer may consist of a hard magnetic material.

As a mechanism for fixing the magnetization of the second ferromagnetic layer nearly in the direction along the sensor height, a magnetic exchange coupling with the second antiferromagnetic layer formed on the face of the side opposite to the 90-degree magnetic interlayer coupling layer and connected to the second ferromagnetic layer may be used, and a so-called "self-pinned" structure may be used in which the second antiferromagnetic layer is not formed on the face of the side opposite to the 90-degree magnetic interlayer coupling layer connected to the second ferromagnetic layer, the second ferromagnetic layer has at least two ferromagnetic layers, and the ferromagnetic layers are laminated to each other through the antiferromagnetic coupling layer. Moreover, the second ferromagnetic layer may consist of a hard magnetic material.

In the case when at least one of the above-mentioned antiferromagnetic layers and the second antiferromagnetic layer are included, the magnetization directions of the pinned layer and the second ferromagnetic layer can be fixed nearly in the direction along the sensor height by in-field annealing while applying a magnetic field nearly in the direction along the sensor height. The annealing mentioned here means an annealing process in a temperature range which is necessary for the antiferromagnetic layer to apply a magnetic exchange coupling field the ferromagnetic layer. Therefore, concretely, an annealing process in the temperature range of 200 to 300° C. for a time range of several minutes to several hours is applicable. It is preferable that the magnetic field applied during the annealing process is of a magnitude which is needed to magnetically saturate all ferromagnetic layers that are the structural elements of the magnetoresistive film; concretely, a magnetic field from several hundreds kA/m to several MA/m may be applied. Moreover, in the case when neither of the above-mentioned first antiferromagnetic layer and second antiferromagnetic layer is included, the magnetization directions of the pinned layer and the second ferromagnetic layer can be fixed nearly in the direction along the sensor height by applying a static magnetic field nearly in the direction along the sensor height. It is preferable that the static magnetic field is of a magnitude which is needed to magnetically saturate all the ferromagnetic layers that are the structural elements of the magnetoresistive film. Moreover, the temperature of the environment during application of the static magnetic field is not particularly limited, and no problem arises if it is controlled to be 300° C. or less (preferably room temperature) from the viewpoint of the range where it does not affect the properties of the magnetoresistive film. In this case, because it is an objective that the magnetization direction of the ferromagnetic layer which is a structural element of the magnetoresistive film is provided by applying a static magnetic field, the time for applying the static magnetic field is sufficient if it is several seconds or more.

Therefore, according to the present invention, the magnetizations of the pinned layer and the second ferromagnetic layer can be easily fixed nearly in the direction along the sensor height, and, at the same time, the magnetization of the ferromagnetic layer applying the longitudinal biasing field to the free layer can be automatically directed nearly to the track width direction. Moreover, because magnetic flux returns between the free layer and the first ferromagnetic layer at the track edges, the influence of the demagnetizing field in the free layer at the track edges can be controlled.

According to the present invention, the magnetization direction of the ferromagnetic layer applying a longitudinal biasing field to the pinned layer and the free layer can be easily controlled and, moreover, the influence of the demagnetizing field in the free layer at the track edges can be reduced; therefore, a magnetoresistive head and a manufacturing process thereof can be provided, in which excellent read sensitivity and reproducing properties with low noise and high reliability can be achieved, even when the track width becomes narrower.

BRIEF DESCRIPTION OF THE DRAWINGS

FIG. 3 is a comparison of magnetization curves for the case where the ferromagnetic interlayer coupling and the 90-degree magnetic interlayer coupling are present.

FIG. 8 shows a comparison of transfer curves and magnetization states of free layers at a zero magnetic field between a prior art and the present invention.

FIG. 12 is a process flow of longitudinal biasing methods of a ferromagnetic layer of the present invention.

DETAILED DESCRIPTION OF THE INVENTION

Specific embodiments of the present invention will be described with reference to the accompanying drawings as follows. In order to understand them easily, in each of the following figures, the same functional part will be shown using the same code.

EMBODIMENT 1

Figure 1:
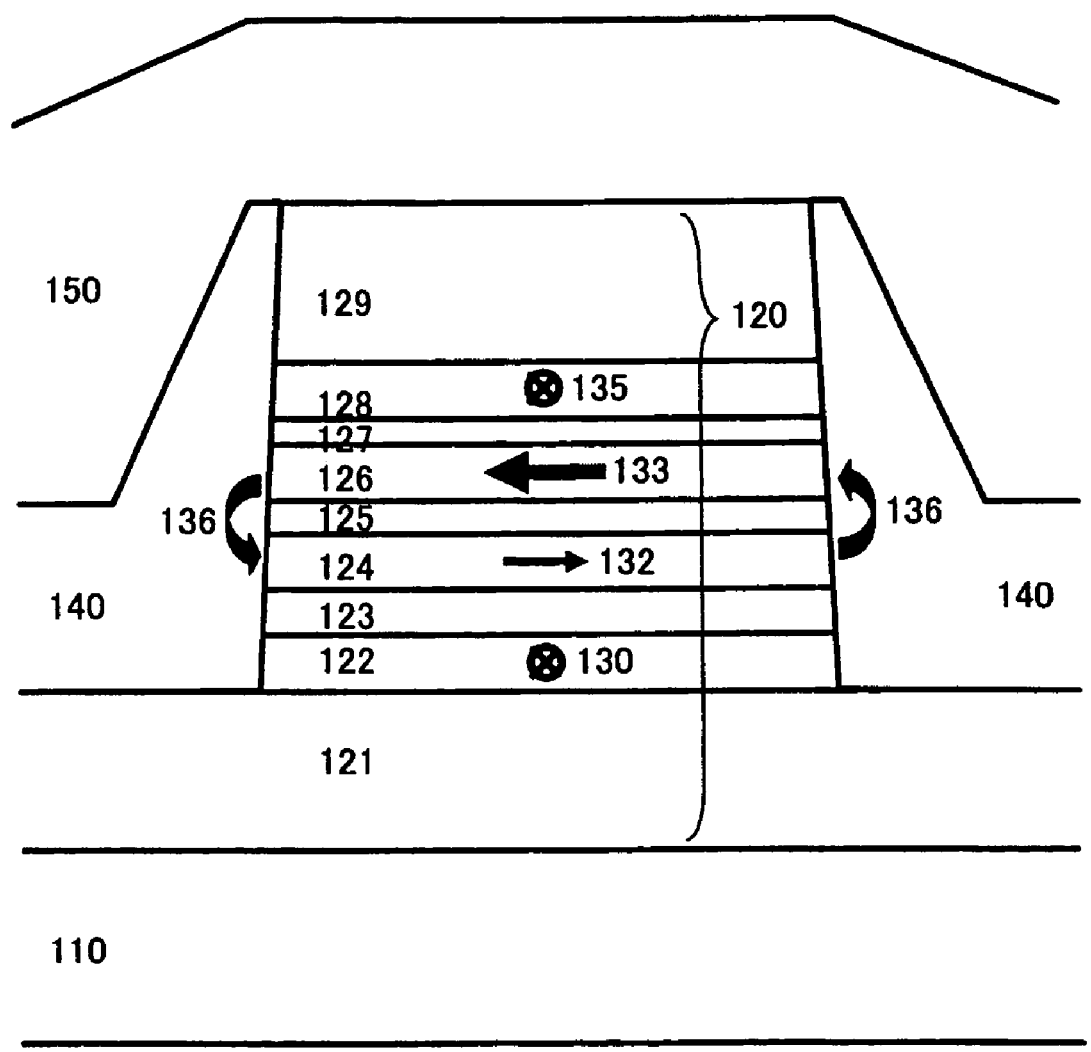
FIG. 1 is a schematic diagram illustrating an example of a magnetoresistive head of the first embodiment of the present invention as seen from the air bearing surface.

FIG. 1 is a schematic diagram illustrating an example of a magnetoresistive head of the embodiment 1 of the present invention as seen from the air bearing surface. The structure together with an outline of the fabricating procedure of a magnetoresistive head will be described below.

A magnetoresistive film 120 is deposited on the substrate (not shown in the figure) after forming a lower shield 110, and the track width direction is patterned into a desired shape by using photolithography, ion milling, or reactive ion etching. Next, an insulator layer 140 is formed at both ends of the magnetoresistive film 120 using a lift-off method. Similarly, in the direction along the sensor height, the magnetoresistive film 120 is patterned into a desired shape by using photolithography, ion milling, or reactive ion etching, and the insulator layer is formed using a lift-off method. The order of patterning the magnetoresistive film 120 may also be exchanged between the track width direction and sensor height direction. Then, an upper shield 150 is formed. The lower shield 110 and the upper shield 150 are also working as a pair of electrodes supplying current in the film thickness direction of the magnetoresistive film 120, and they detect the electrical resistivity change of the magnetoresistive film 120. Therefore, it is preferable that interfaces between the lower shield 110 and the magnetoresistive film 120 and between the magnetoresistive film 120 and the upper shield 150 are free of electrical contact resistance. In order to mitigate this effect, just prior to forming the magnetoresistive film 120 and the upper shield 150, it is effective that surface oxide layers and adherents/absorbents are removed by using plasma etching or ion beam etching.

Furthermore, the lower shield and the lower electrode can be formed individually as substrate/lower shield/lower gap/lower electrode/magnetoresistive film (similar to the upper shield and upper electrode). Moreover, the insulator layer 140 is arranged so as not to make an electrical short circuit between the lower shield 110 and the upper shield 150. When the film thickness of the insulator layer 140 is made thinner in the range where the electrical insulation can be maintained between the lower shield 110 and the upper shield 150, it becomes possible to make a part of the upper shield 150 function as a so-called "side-shield" and it is effective in making the effective track width narrower, resulting in it becoming a preferable mode.

A basic film configuration of the magnetoresistive film 120 is a first antiferromagnetic layer 121/pinned layer 122/intermediate layer 123/free layer 124/separate layer 125/first ferromagnetic layer 126/90-degree magnetic interlayer coupling layer 127/second ferromagnetic layer 128/second antiferromagnetic layer 129. The structure applying a longitudinal biasing field to the free layer 124 is a section of the separate layer 125/first ferromagnetic layer 126/90-degree magnetic interlayer coupling layer 127/second ferromagnetic layer 128/second antiferromagnetic layer 129. Needless to say, an appropriate underlayer and an appropriate protective layer may be formed on a bottommost layer and on the topmost layer, respectively. Moreover, if the order of lamination is reversed as second antiferromagnetic layer 129/second ferromagnetic layer 128/90-degree magnetic interlayer coupling layer 127/first ferromagnetic layer 126/separate layer 125/free layer 124/intermediate layer 123/pinned layer 122/first antiferromagnetic layer 121, it would not run counter to the spirit of the present invention.

Additionally, in FIG. 1, the first antiferromagnetic layer 121 is not etched in the track width dimension, and it is patterned wider than a section of the pinned layer 122/intermediate layer 123/free layer 124/separate layer 125/first ferromagnetic layer 126/90-degree magnetic interlayer coupling layer 127/second ferromagnetic layer 128/second antiferromagnetic layer 129. When etching the magnetoresistive layer 120, fabrication in the above-described shape is possible by controlling the etching time while monitoring etched particles using a mass spectrometer, etc. In a current perpendicular-to-plane magnetoresistive head, a parasitic resistance of a material which has a large specific resistance such as the antiferromagnetic layer etc. causes a decrease in reproducing output. Therefore, like the structure shown in the figure, the first antiferromagnetic layer 121 can be used as a part of the lower electrode when the first antiferromagnetic layer 121 is patterned wider than the track width, and it is effective in deterring the decrease in the reproducing output.

In this embodiment, the first antiferromagnetic layer 121 is shown as a shape not etched, but a part of the first antiferromagnetic layer 121 may be etched in the thickness direction. Conversely, in addition to the first antiferromagnetic layer 121, a part of the pinned layer 122 or a part of the pinned layer 122 and the intermediate layer 123 may not be etched in the film thickness direction. In the case when the decrease of the reproducing output caused by the parasitic resistance is small and a sufficiently high reproducing output can be expected, patterning may be done to the bottommost surface of the first antiferromagnetic layer 121 or a part of the lower shield 110 in the track width dimension.

In FIG. 1, the magnetization direction of each ferromagnetic layer is indicated by an arrow. On this an overview of the reproducing operation and the sensor applying a longitudinal biasing field to the free layer 124 are described.

The magnetization of the pinned layer 122 is fixed in the direction along the sensor height: 130 (it may also be the opposite direction) by the magnetic exchange coupling with the first antiferromagnetic layer 121 which is formed adjoining. Similarly, the magnetization of the second ferromagnetic layer 128 is fixed in the direction along the sensor height: 135 (it may also be the opposite direction) by the magnetic exchange coupling with the second antiferromagnetic layer 129 which is formed adjoining. On the other hand, an interlayer coupling, in which the magnetizations are directed so as to be mutually orthogonal, is created between the first ferromagnetic layer 126 and the second ferromagnetic layer 128 through the 90-degree magnetic interlayer coupling layer 127, resulting in the first ferromagnetic layer 126 having a magnetization in the direction along the track width: 133 (it may also be the opposite direction) under the condition that the external magnetic field is zero. At this time, at the track edges, as indicated by arrows 136, the magnetization directions of the free layer 124 and the first ferromagnetic later 126 are stabilized in the direction along the track width by returning the magnetic flux between the free layer 124 and the first ferromagnetic layer 126. That is, a longitudinal biasing field is applied to the free layer 124 practically in the direction along the track width: 132, and it creates the effect of making the free layer 124 a single magnetic domain. Moreover, in the case when the free layer 124 and the first ferromagnetic layer 126 create antiferromagnetic interlayer coupling through the separate layer 125, the effect is further enhanced.

The magnetization of the pinned layer 122 is strongly fixed in the direction along the sensor height: 130. On the other hand, the magnetization of the free layer 124 easily rotates in response to an external magnetic field although a longitudinal biasing field is applied in the direction along the track width: 132 from the first ferromagnetic layer 126. Therefore, the relative angle between the pinned layer 122 and the free layer 124 changes in response to a signal field from the magnetic medium; correspondingly, the electrical resistivity of the magnetoresistive film 120 changes and an electromagnetically transformed reproducing output is obtained.

Figure 2:
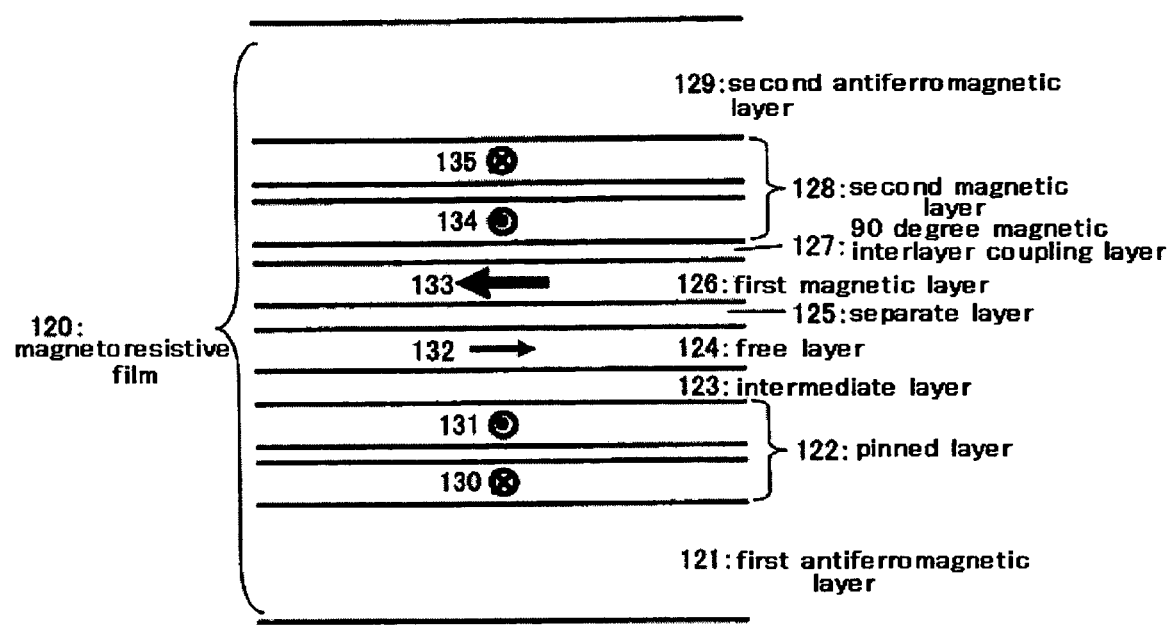
FIG. 2 is a schematic drawing illustrating an example of detailed structure of a magnetoresistive film of the present invention as seen from the surface facing the medium.

FIG. 2 is a detailed structure illustrating an example of the magnetoresistive film 120. Both the pinned layer 122 and the second ferromagnetic layer 128 may take a so-called "synthetic ferromagnetic" structure consisting of ferromagnetic layer/antiferromagnetic interlayer coupling layer/ferromagnetic layer. For this reason, the magnetization directions of the pinned layer 122 and the second ferromagnetic layer 128 can be more strongly fixed in the direction along the sensor height by taking the synthetic ferromagnetic structure, and the practical magnetic moments of the pinned layer 122 and the second ferromagnetic layer 128 can be made remarkably smaller, resulting in the in-plane biasing field to the free layer 124 being considerably reduced.

Next, each component of the magnetoresistive head shown in FIG. 1 and FIG. 2 will be described.

Commonly used materials for the substrate, the lower shield 110, the upper shield 150, and the insulator films 140 are shown as one example, because they are not necessarily limited in the present invention. AlTiC, SiC or those coated with $Al_2O_3$ are used for the substrate. Single layer or multi-layer films selected from Ni—Fe alloys and their nitrates, Co—Zr, Co—Hf, or Co—Ta based amorphous alloys, etc. are used for the lower shield 110 and the upper shield 150. It is easy to form these by a sputtering method and a plating method. Short circuits between the lower shield 110 and the upper shield 150 can be prevented by using $Al_2O_3$, $SiO_2$, AlN, SiN, or mixtures thereof and multi-layer films as the insulator films 140. It is easy and preferable to form these by a sputtering method.

The magnetoresistive film 120 is preferably formed by a sputtering method from the viewpoint of film thickness, controllability of alloy composition, and mass-production efficiency. An example of the film configuration of the magnetoresistive film 120 is as follows. For instance, Ta(2.5) /$Ni_{47}Cr_{40}Fe_{13}$(3.5) /$Ni_{85}Fe_{15}$(1) /$Mn_{49}Pt_{51}$(14) /$Co_{90}Fe_{10}$(2) /Ru(0.45) /$Co_{90}Fe_{10}$(2) /Cu(3) /$Co_{90}Fe_{10}$(1) /$Ni_{85}Fe_{15}$(1.5) /Cu(0.65) /Ru(0.8) /$Co_{40}Fe_{60}$(1.8) /$Mn_{49}Pt_{51}$(1.2) /Co90Fe10(2) /Ru(0.45) /$Co_{90}Fe_{10}$(2) /$Mn_{49}Pt_{51}$(12) /Ta(5), etc. Herein, the number shown in parentheses( ) is the film thickness, and the unit is nm. The unit of each alloy component showing the subscript of each element is at %. Ta(2.5) /$Ni_{47}Cr_{40}Fe_{13}$(3.5) /$Ni_{85}Fe_{15}$(1) corresponds to the underlayer, $Mn_{49}Pt_{51}$(14) to the first antiferromagnetic layer 121, $Co_{90}Fe_{10}$(2) /Ru(0.45) /$Co_{90}Fe_{10}$(2) to the pinned layer 122, Cu(3) to the intermediate layer 123, $Co_{90}Fe_{10}$(1) /$Ni_{85}Fe_{15}$(1.5) to the free layer 124, Cu(0.65)/ Ru (0.8) to the separate layer 125, $Cu_{60}Fe_{40}$(1.8) to the first ferromagnetic layer 126, $Mn_{49}Pt_{51}$(1.2) to the 90-degree magnetic interlayer coupling layer 127, $Co_{90}Fe_{10}$(2) /Ru (0.45)/$Co_{90}Fe_{10}$(2) to the second ferromagnetic layer 128, $Mn_{49}Pt_{51}$(12) to the second antiferromagnetic layer 129, and Ta(5) to the protective layer, respectively. This configuration example corresponds to a magnetoresistive film for a CPP (Current Perpendicular to the Plane)-GMR head in which a nonmagnetic conductive layer is used for the intermediate layer 123. As the nonmagnetic conductive layer, Ag and Au, etc. can be used besides Cu. Additionally, so-called current confined path type may be used in which a very thin oxide film ($Co_{90}Fe_{10}$(1)-oxide) is inserted in the nonmagnetic conductive layer.

In the above-mentioned configuration example, the present invention can be applied to a tunneling magnetoresistive film as it is when the intermediate layer 123 is changed from a nonmagnetic conductive layer to a nonmagnetic tunneling barrier layer. Al (0.45)-oxide is used for a nonmagnetic tunneling barrier layer. Herein, the expression "Al (0.45)-oxide" means that it employs a so-called natural oxidation method, in which oxygen is introduced in the chamber after the deposition of an Al film. If control is possible to prevent excess oxidation, methods such as radical oxidation and plasma oxidation may be used, and an oxide film may be formed by reactive sputtering, and $Al_2O_3$ may be directly deposited. Additionally, besides Al oxide, an oxide or nitride including Mg, Al, Si, Ti, V, Mn, Zr, Nb, Hf, and Ta may be used.

Besides a single-layer film, for instance Ni—Fe or Co—Fe, etc., a magnetic multilayer film such as Co—Fe /Ni—Fe and Co—Fe /Ni—Fe /Co—Fe, etc. may be used for the ferromagnetic material of the pinned layer 122, the free layer 124, the first ferromagnetic layer 126, and the second ferromagnetic layer 128, which are components of the magnetoresistive film 120. Moreover, a synthetic ferromagnetic structure such as Co—Fe /Ni—Fe /Ru/Ni—Fe may be used for the free layer 124.

A material mainly composed of Fe, Co, and Ni which has a high spin polarization ratio at the Fermi energy may be used on the faces in contact with the intermediate layer 123 of the pinned layer 122 and the free layer 124 in order to make the MR ratio larger which strongly affects the reproducing output. Moreover, it is more useful to use Heusler alloys such as $Co_{50}Mn_{25}Ge_{25}$ and $Co_{50}Mn_{25}Si_{25}$ etc. or half metals such as $Fe_3O_4$, etc. which have a larger spin polarization ratio. Furthermore, it is desirable that the composition and film thickness of the free layer 124 be properly adjusted to exhibit low magnetostriction and low coercivity.

Since the magnetizations of both the pinned layer 122 and the second ferromagnetic layer 128 have only to be fixed in the direction along the sensor height, it is not necessary to systematically use materials which have different blocking temperatures for the first ferromagnetic layer 121 and the second ferromagnetic layer 129, and the same material can be used. Therefore, it is preferable that an ordered alloy such as Mn—Pt, etc. be used, which has a large magnetic exchange coupling field, excellent thermal stability, and superior corrosion resistance. Besides Mn—Pt, the same properties can be obtained by using an ordered alloy antiferromagnetic film composed of a Mn-M1 alloy which contains about 45 at % to 55 at % Mn, and at least one part of which is phase-transformed by annealing at around 230 to 270° C. to a Cu—Au type ordered structure and becomes antiferromagnetic, and where $M_1$ is at least one element selected from the group of Ni, Ru, Rh, Pd, Re, Os, Ir, and Pt. The magnetizations of both the pinned layer 122 and the second ferromagnetic layer 128 can be fixed in the direction along the sensor height by annealing at around 230 to 270° C. for three hours while applying a magnetic field in the direction along the sensor height after forming the magnetoresistive film 120.

The magnetization curves of the case where the ferromagnetic interlayer coupling and the 90-degree magnetic interlayer coupling are present are compared in FIG. 3. The layer configuration is substrate /Ta (2.5) /$Ni_{47}Cr_{40}Fe_{13}$ (3.5) /$Ni_{85}Fe_{15}$(1) /$Mn_{49}Pt_{51}$(14) /$Co_{75}Fe_{25}$(1.5) /Ru (0.8) /$Co_{75}Fe_{25}$(2) /interlayer coupling layer /$Co_{90}Fe_{10}$ (0.5/Ta(5). After the deposition, the magnetization of $Co_{75}Fe_{25}$(1.5) /Ru(0.8) /$Co_{75}Fe_{25}$(2) was fixed in the direction along the sensor height by annealing at 250° C. for nine hours while applying a magnetic field of 1.1 MA/m in the direction along the sensor height. (A) Al-oxide and (B) MnPt were compared as the interlayer coupling layer. Al-oxide was formed as follows: after 0.48 nm of Al was deposited, oxygen was introduced into the same vacuum chamber to reach a pressure of 200 Pa and then held for 20 minutes. In detail the MnPt is $Mn_{49}Pt_{51}$ (1.2 nm). As for the $Co_{90}Fe_{10}$ (0.5) /$Ni_{85}Fe_{15}$(3), a magnetization curve measured by sweeping the magnetic field in the direction along the sensor height and a magnetization curve measured by sweeping the magnetic field in the direction along the track width are shown in FIG. 3.

In the case of (A) an Al-oxide interlayer coupling layer, the magnetization curve measured in the direction along the sensor height has the shape where the curve excited in easy axis direction is shifted by about 4.5 kA/m in the positive magnetization direction (the magnetization direction of $Co_{75}Fe_{25}$ (2)), and the magnetization curve measured in the direction along the track width looks like a curve excited in hard axis direction. This suggests that the magnetizations of $Co_{75}Fe_{25}$ (2) and $Co_{90}Fe_{10}$(0.5) /$Ni_{85}Fe_{15}$(3) are ferromagnetically coupled to each other through the Al-oxide interlayer coupling layer. On the other hand, in the case of (B) a MnPt interlayer coupling layer, the magnetization curve measured in the direction along the sensor height looks like a curve excited in hard axis direction, and the magnetization curve measured in the direction along the track width looks like a curve excited in easy axis direction. That is, it is understood that a 90-degree magnetic interlayer coupling is created between the $Co_{75}Fe_{25}$(2) and $Co_{90}Fe_{10}$(0.5) /$Ni_{85}Fe_{15}$(3) through the MnPt interlayer coupling layer. The same function can be obtained when a material expressed by Mn—X (where X is at least one element selected from the group of Cr, Fe, Co, Ni, Ru, Rh, Pd, Re, Os, Ir, and Pt), and Cr, Mn, and an oxide layer including at least one element selected from the group of {Mg, Ca, Cr, Mn, Fe, and Co} are used for the interlayer coupling layer.

Figure 4:
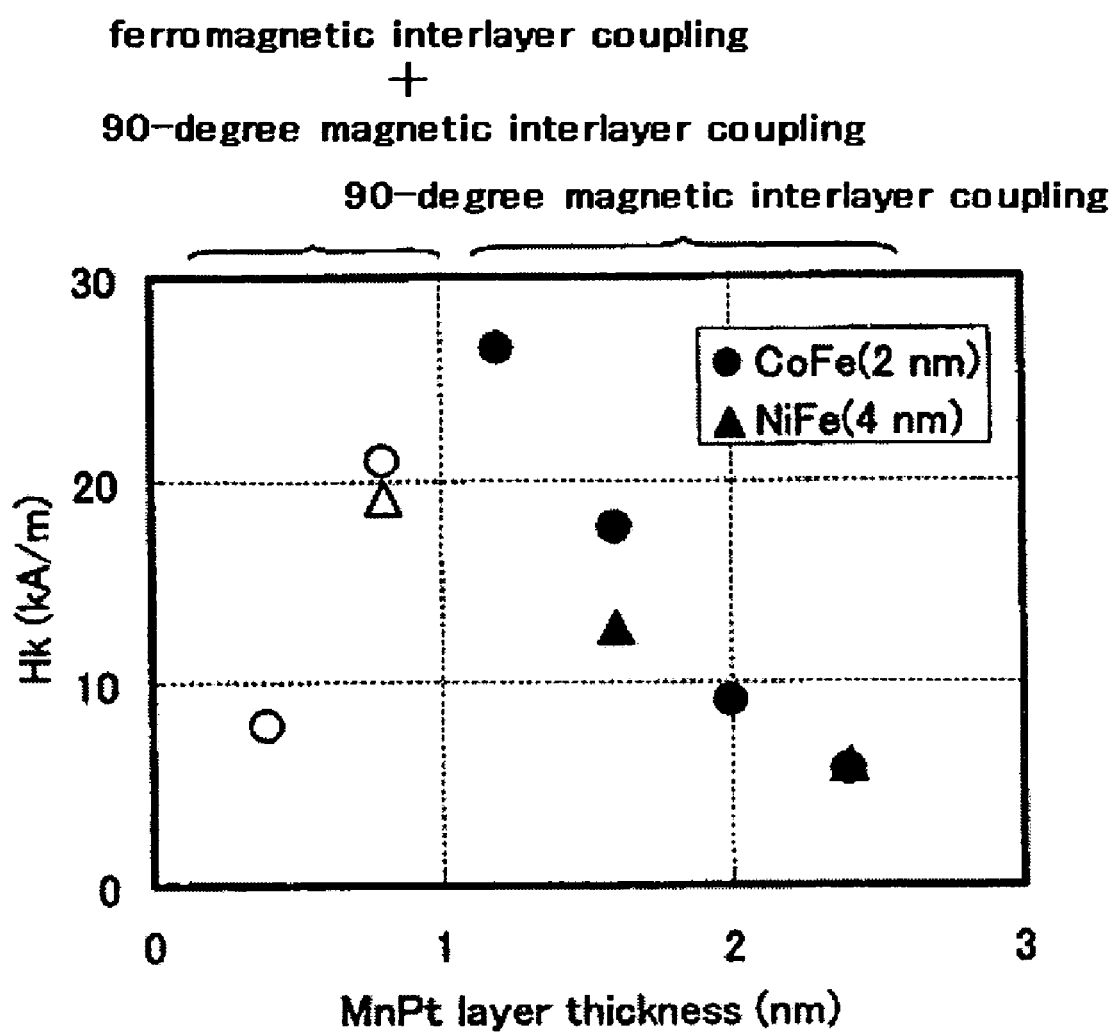
FIG. 4 is a diagram showing a 90-degree magnetic interlayer coupling layer: MnPt film thickness dependence of an anisotropic field applied to the ferromagnetic layer by the 90-degree magnetic interlayer coupling layer.

In order to apply a longitudinal biasing field more stably to the free layer 124, it is preferable that the magnetization direction of the first magnetic layer 126 be maintained in the direction along the track width even if a large external magnetic field is applied. That is, it is preferable that there be nothing but a large 90-degree magnetic interlayer coupling field between the first ferromagnetic layer 126 and the second ferromagnetic layer 128 through the 90-degree magnetic interlayer coupling layer 127. FIG. 4 shows the 90-degree magnetic interlayer coupling layer: MnPt film thickness dependence of the anisotropic field applied to the ferromagnetic layer by the 90-degree magnetic interlayer coupling layer. The film configuration is substrate /$Ni_{47}Cr_{40}$ $Fe_{13}$(3.2) /$Ni_{85}Fe_{15}$(0.8) /$Mn_{49}Pt_{51}$(14) /$Co_{90}Fe_{10}$(3) /Ru (0.8) /$Co_{90}Fe_{10}$(3) /$Mn_{49}Pt_{51}$(t) /$Co_{90}Fe_{10}$(2) or $Ni_{85}Fe_{15}$(4) deposition, the magnetization of $Co_{90}Fe_{10}$(3)/Ru (0.8) /$Co_{90}Fe_{10}$(3) was fixed in the direction along the sensor height by annealing at 270° C. for three hours while applying a magnetic field of 1.1 MA/m in the direction along the sensor height. The anisotropic field applied to the ferromagnetic layer: $Co_{90}Fe_{10}$(2) or $Ni_{85}Fe_{15}$(4) was estimated from the saturated magnetic field of the magnetization curve measured by sweeping the magnetic field in the direction along the sensor height. The thicker the 90-degree magnetic interlayer coupling layer: MnPt film thickness is, the greater the anisotropic field is, and an anisotropic field of about 27 kA/m was obtained when the MnPt film thickness was 1.2 nm. However, when the film thickness is made thinner, the ferromagnetic interlayer coupling becomes dominant in addition to the perpendicular interlayer coupling. Therefore, in the case when MnPt is used for the 90-degree magnetic interlayer coupling layer, the film thickness may be controlled to be about 1 nm or more and about 2.5 nm or less.

Figure 5:
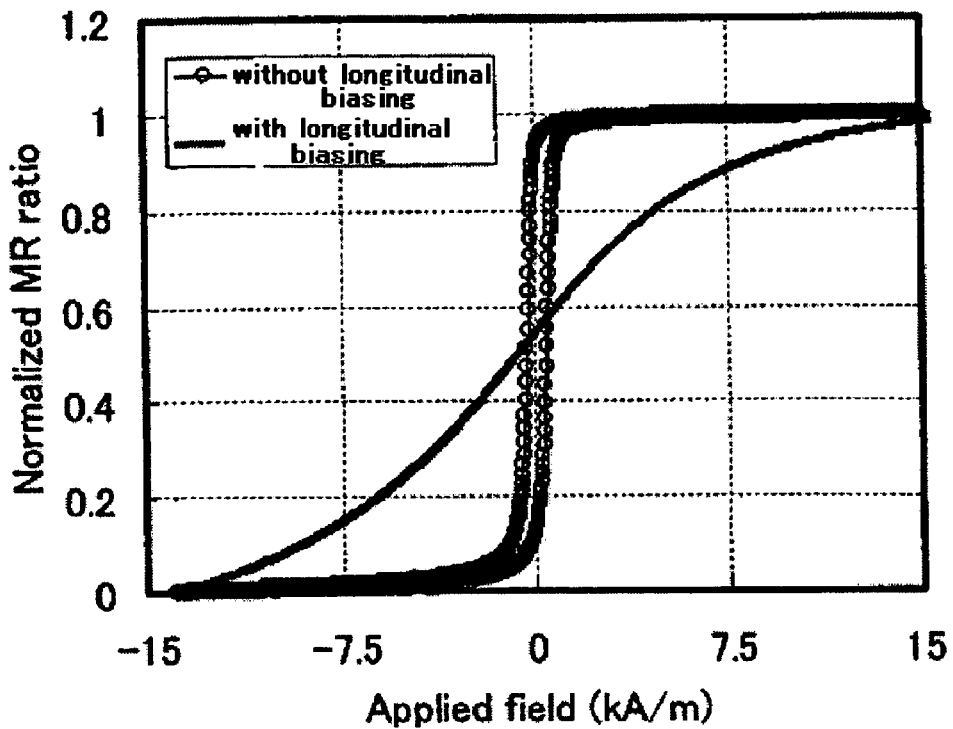
FIG. 5 is a diagram showing a comparison of the difference of magnetoresistive transfer curves for cases with or without a system of applying a longitudinal biasing field.

FIG. 5 shows a comparison of the difference of magnetoresistive transfer curves for cases with or without a system of applying a longitudinal biasing field. The film configuration of the spin-valve is substrate /$Ni_{47}Cr_{40}Fe_{13}$(3.2) /$Ni_{85}Fe_{15}$ (0.8) /$Mn_{49}Pt_{51}$(14) /$Co_{90}Fe_{10}$(3) /Ru (0.8) /$Co_{90}Fe_{10}$(3) /Cu (2.2) /$Co_{90}Fe_{10}$(1) /$Ni_{85}Fe_{15}$(1.5). In the case of no system of applying a longitudinal biasing field, Cu (0.8) /Ta(2) is laminated for the protective film, and, in the case when a system of applying a longitudinal biasing field does exist, Cu(0.6) /Ru (0.8) /$Co_{90}Fe_{10}$(2) /$Mn_{49}Pt_{51}$(1.2) /$Co_{90}Fe_{10}$(2) /Ru(0.8/ $Mn_{49}Pt_{51}$(14) /Ta(2) are laminated. After the deposition, the magnetization of $Co_{90}Fe_{10}$(3) /Ru(0.8) /$Co_{90}Fe_{10}$(3) was fixed in the direction along the sensor height by annealing at 270° C. for three hours while applying a magnetic field of 1.1 MA/m in the direction along the sensor height. The magnetization of $Co_{90}Fe_{10}$(2) /Ru(0.8) /$Co_{90}Fe_{10}$(2) was also fixed in the same way in the case when a system of applying a longitudinal biasing field exists. A magnetoresistive transfer curve measured in a CIP (Current In the Plane) mode by sweeping the magnetic field in the direction along the sensor height is shown. The magnetization process for each ferromagnetic layer is the same regardless of whether the current flow direction is CIP or CPP, so that it is understood that this result is a result of the CPP mode as it is. In the case where a system of applying a longitudinal biasing field does not exist, since the easy axis of the free layer: $Co_{90}Fe_{10}$(1) /$Ni_{85}Fe_{15}$ (1.5) is aligned in the direction along the sensor height by the above-mentioned in-field annealing, it becomes a magnetoresistive transfer curve with a slight hysteresis excited in the easy axis direction. On the other hand, since a longitudinal biasing field is applied to the free layer: $Co_{90}$ $Fe_{10}$(1) /$Ni_{85}Fe_{15}$(1.5) in the direction along the track width in the case where a system of applying a longitudinal biasing field does exist, the magnetoresistive transfer curve is the one excited in the easy axis direction, so that hysteresis cannot be observed, and an excellent linear response is obtained in the vicinity of zero magnetic field.

Figure 6:
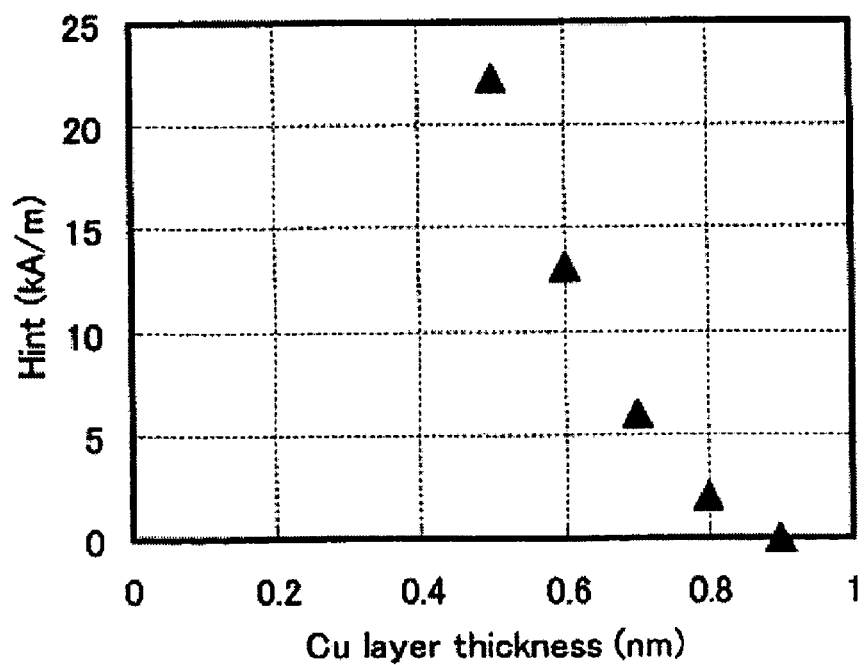
FIG. 6 is a diagram showing a Cu film thickness dependence of the antiferromagnetic interlayer coupling field.

The response sensitivity of the free layer 124 to an external magnetic field can be arbitrarily varied according to the magnitude of antiferromagnetic interlayer coupling with the first ferromagnetic layer 126 through the separate layer 125. FIG. 6 shows the Cu film thickness dependence of the antiferromagnetic interlayer coupling field. The film configuration is substrate /$Ni_{47}Cr_{40}Fe_{13}$(3.2) /$Ni_{85}Fe_{15}$(0.8) /$Mn_{49}Pt_{51}$ (14) /$Co_{90}Fe_{10}$(3) /Ru(0.8) /$Co_{90}Fe_{10}$(3) /Cu(0.5) /$Co_{90}Fe_{10}$ (1)-Oxide/Cu(2) /$Co_{90}Fe_{10}$(1) /$Ni_{85}Fe_{15}$(1.5) /Cu(t) /Ru (0.8) /$Co_{40}Fe_{60}$(1.8) /$Mn_{49}Pt_{51}$(12) /Ru(1) /Ta(2). After the deposition, the magnetization of $Co_{90}Fe_{10}(3)$ /Ru (0.8) /$Co_{90}Fe_{10}(3)$ and the magnetization of $Co_{40}Fe_{60}(1.8)$ were fixed in the direction along the sensor height by annealing at 270° C. for three hours while applying a magnetic field of 1.1 MA/m in the direction along the sensor height. The antiferromagnetic interlayer coupling field between the $Co_{90}Fe_{10}(1)$ /$Ni_{85}Fe_{15}(1.5)$ free layer and the $Co_{40}Fe_{60}(1.8)$ first ferromagnetic layer through the Cu(t)/Ru(0.8) separate layer was estimated from the magnitude of the shift of the magnetization curve of the $Co_{90}Fe_{10}(1)$ /$Ni_{85}Fe_{15}(1.5)$ free layer measured by sweeping the magnetic field in the direction along the sensor height. The antiferromagnetic interlayer coupling of this film configuration is essentially created by Ru(0.8) and the magnitude was diluted by laminating the Cu(t) layer.

As clearly shown in FIG. 6, the thicker the Cu film thickness of the separate layer, the smaller the antiferromagnetic interlayer coupling field is. It is understood that the magnitude of antiferromagnetic interlayer coupling is arbitrarily changeable because the change is continuously variable. Cr, Cu, Ru, Rh, Pd, Re, Ir, Au, etc., and alloys based thereon, and multilayer films can be used as the separation film which create antiferromagnetic interlayer coupling. However, if the antiferromagnetic interlayer coupling between the free layer and the first ferromagnetic layer is made too strong, the problem of decreasing output arises because the magnetization of the free layer becomes difficult to rotate by the signal field from the medium. As in the aforementioned example, the strength of the antiferromagnetic coupling can be regulated appropriately by making the separate layer multilayer and by making the film thickness thicker, and it is desirable to make high magnetic field sensitivity compatible with the suitable longitudinal biasing effect.

Moreover, as mentioned above, the magnetostatic coupling between the free layer 124 and the first ferromagnetic layer 126 at the track edges is one factor determining the longitudinal biasing field. It heavily depends on the ratio of the magnetic moment of the free layer 124 and the first ferromagnetic layer 126, so that the preferable configuration is realized because both magnetization directions become stable when both magnetic moments are almost the same.

Figure 7:
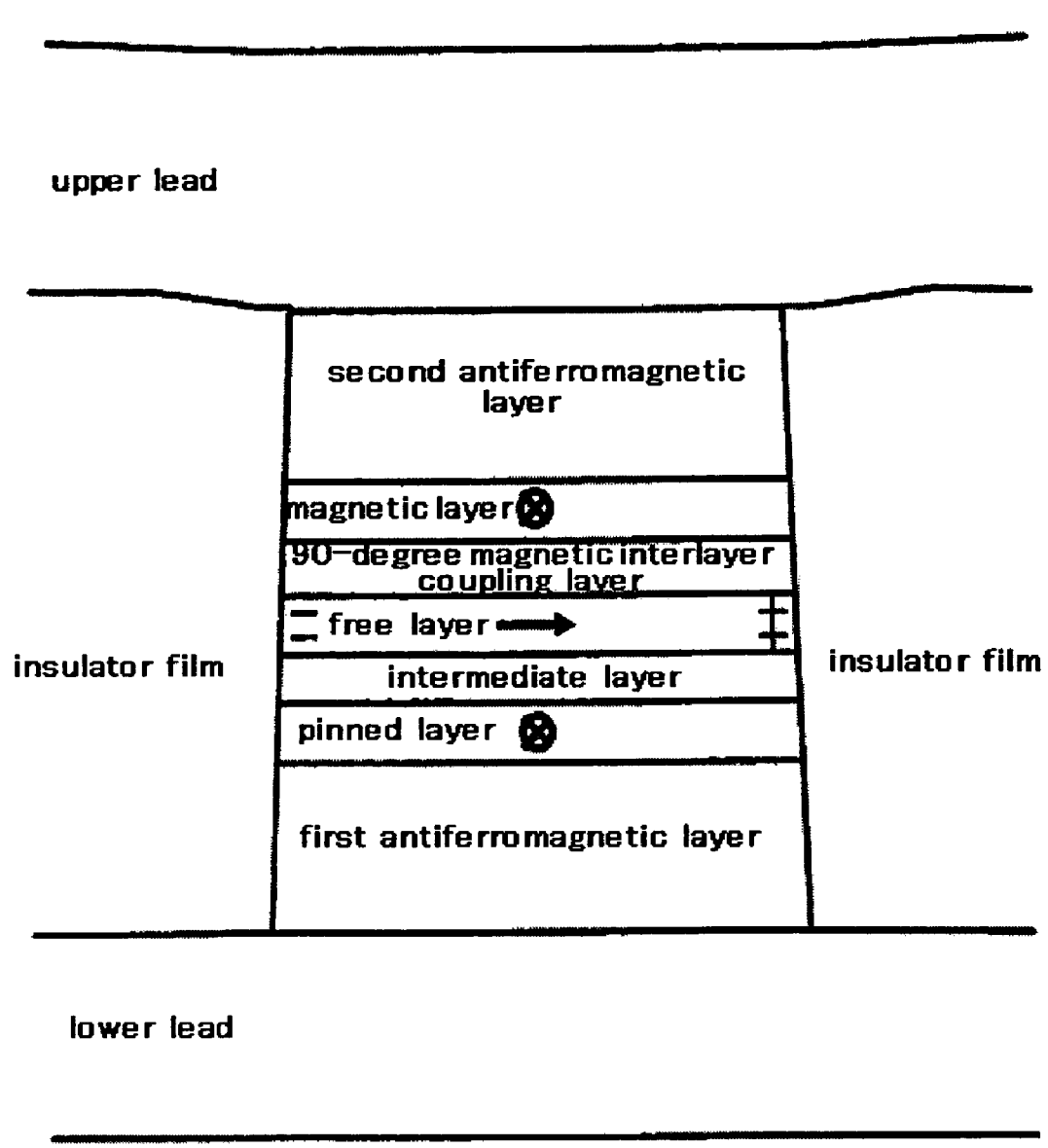
FIG. 7 is a schematic diagram illustrating an example of a magnetoresistive head of a prior art as seen from the air bearing surface.

Next, the effects of the present invention will be described and compared to the prior arts. FIG. 7 is a schematic diagram illustrating an example of a magnetoresistive head as seen from the air bearing surface of a prior art. In the prior art, the magnetoresistive film consists of the first antiferromagnetic layer/pinned layer/intermediate layer/free layer/90-degree magnetic interlayer coupling layer/ferromagnetic layer/second antiferromagnetic layer. Magnetizations of both the pinned layer and the ferromagnetic layer are fixed in the direction along the sensor height and an interlayer coupling field is applied to the free layer through the 90-degree magnetic interlayer coupling layer in a direction orthogonal to the ferromagnetic layer (that is, the track width direction). That is, in the prior art, the 90-degree magnetic interlayer coupling itself becomes the origin for applying the longitudinal biasing field. However, in this structure, there is concern that magnetic poles are created at the track edges in the free layer and that they become an obstacle to making it a single magnetic domain by a demagnetization effect.

FIG. 8 shows the reproducing output properties versus the magnetic field calculated using a micro-magnetic simulator comparing the prior art with the present invention. Moreover, microscopic magnetic arrays of the free layer in zero magnetic field are also shown in this figure. In contrast to the generation of clear hysteresis in the prior art, in the present invention, hysteresis is not observed, and excellent linear response is demonstrated. As clearly shown in the microscopic magnetic arrays of the free layer in zero magnetic field, in the prior art the magnetization of the free layer is not uniformly aligned in the track direction because of the effects of the demagnetization field at the track edges. However, the magnetization of the free layer of the present invention is uniformly aligned in the track direction. In the structure of the present invention it is understood that magnetic flux returns at the track edges between the free layer 124 and the first ferromagnetic layer 126 and the effects of a demagnetization field can be drastically reduced. Therefore, according to the present invention, high read sensitivity and reproducing properties with low noise and excellent linear response can be obtained.

EMBODIMENT 2

Figure 9:
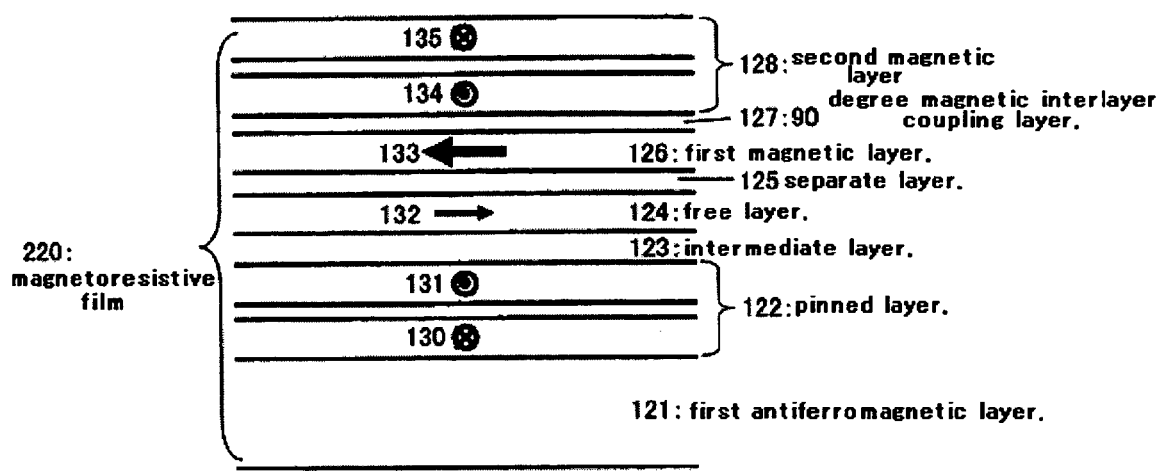
FIG. 9 is a schematic diagram illustrating an example of a magnetoresistive film used in the second embodiment of a magnetoresistive head of the present invention as seen from the air bearing surface.

FIG. 9 is a schematic diagram illustrating an example of a magnetoresistive film 220 of the embodiment 2 of the present invention as seen from the air bearing surface. It is a magnetoresistive head in which the magnetoresistive film 120 of the embodiment 1 of the present invention is only substituted by the magnetoresistive film 220, so that the detailed head configuration is omitted. In this embodiment, it has a structure in which the second antiferromagnetic layer 129 is removed from a part of the system of the embodiment 1 for applying a longitudinal biasing field: separate layer 125/first ferromagnetic layer 126/90-degree magnetic interlayer coupling layer 127/second ferromagnetic layer 128/second antiferromagnetic layer 129. That is, the second ferromagnetic layer 128 has a so-called "self-pinned" structure consisting of ferromagnetic layer 1/antiferromagnetic coupling layer/ferromagnetic layer 2, thereby fixing the magnetization direction of the second ferromagnetic layer 128 in the direction along the sensor height.

In order to strongly fix the magnetization direction of the second ferromagnetic layer 128 having a self-pinned structure even if an external magnetic field is applied, the following four methods are effective. (1) It is preferable that at least one layer of a plurality of ferromagnetic layers constituting the second ferromagnetic layer 128 is made of a hard magnetic material. For instance, in the case of a Co—Fe alloy, the coercivity Hc of Co—Fe shows a maximum value at an Fe composition of around 50 at %, and a value as large as about 25 kA/m can be obtained. Moreover, adding an element selected from a noble metal such as Pt and Pd, etc., and V, Cr, Nb, and Mo, etc., is effective to increase the coercivity. (2) It is preferable to control the film thickness to make the practical magnetic moment almost zero when the two ferromagnetic layers laminated on each other through the antiferromagnetic coupling layer are magnetically aligned anti-parallel. (3) It is preferable to make the antiferromagnetic coupling stronger. Ru, Rh, Pd, Re, and Ir are preferable materials for an antiferromagnetic coupling layer material having a large antiferromagnetic coupling. Moreover, a rather large antiferromagnetic coupling is obtained in the case when the film thickness of the antiferromagnetic coupling layer is made thinner. For instance, the film thickness is usually controlled to be about 0.8 nm when Ru is used for the antiferromagnetic coupling layer. However, a rather large antiferromagnetic coupling can be obtained in the case of a film thickness of 0.35 nm to 0.45 nm. (4) It is preferable to increase the number of laminated layers such as ferromagnetic layer 1/antiferromagnetic coupling layer 1/ferromagnetic layer 2/coupling layer 2/ferromagnetic layer 3/coupling layer 3/ferromagnetic layer 4.

When combining these four methods, the magnetization direction of the second ferromagnetic layer 128 can be strongly fixed, and, in the $Co_{90}Fe_{10}(2.5)$ /Ru(0.35) /$Co_{50}$ $Fe_{50}(2.15)$ configuration, the magnetization of $Co_{90}Fe_{10}$ (2.5) /Ru(0.35) /$Co_{50}Fe_{50}(2.15)$ does not change even if a magnetic field of ±80 kA/m is applied. Moreover, in the case of $Co_{90}Fe_{10}(2.5)$ /Ru(0.35) /$Co_{50}Fe_{50}(2.15)$ /Ru (0.35) /$Co_{90}Fe_{10}(2.5)$ /Ru(0.35) /$Co_{50}Fe_{50}(2.15)$, the magnetization direction does not change even if a magnetic field of ±120 kA/m is applied. When the configuration, in which the number of ferromagnetic layers in the second ferromagnetic layer 128 is increased, is applied to a CIP-GMR head, reduction in reproducing output is brought about due to the effect of splitting loss. However, this effect does not become a problem in a current perpendicular-to-plane magnetoresistive head which is the target of the present invention. It is preferable that the number of laminated layers be properly controlled because the total film thickness of the magnetoresistive film increases and it becomes a disadvantage to make the gap of the upper and lower shields narrower when the number of laminated layers is increased more than necessary.

As mentioned above, the magnetization direction of the second ferromagnetic layer 128 can be fixed strongly and stable reproducing properties can be obtained by the following conditions: at least two ferromagnetic layers are included in the second ferromagnetic layer 128, the ferromagnetic layers are laminated through the antiferromagnetic coupling layer, the adjacent ferromagnetic layers consist of a laminated body antiferromagnetically coupled to each other, at least one ferromagnetic layer consists of a hard magnetic material with strong coercivity, and the film thickness of each ferromagnetic layer is controlled to make the magnetic moment almost substantially zero when the magnetization of each ferromagnetic layer is aligned antiparallel. The material and film thickness of each layer may be properly controlled within a range meeting these conditions. Since the configuration except for the second ferromagnetic layer 128/the second antiferromagnetic layer 129 and the principles of operation are the same as those of the embodiment 1, a detailed explanation is omitted.

The following two effects can be expected as compared with the embodiment 1, because this embodiment does not include a second antiferromagnetic layer 129. (1) The total film thickness of the magnetoresistive film can be made thinner, so that it becomes an advantage to make the gap of the upper and lower shields narrower. (2) Decrease in the reproducing output caused by a parasitic resistance can be suppressed because the antiferromagnetic layer having a large specific resistance is decreased.

EMBODIMENT 3

Figure 10:
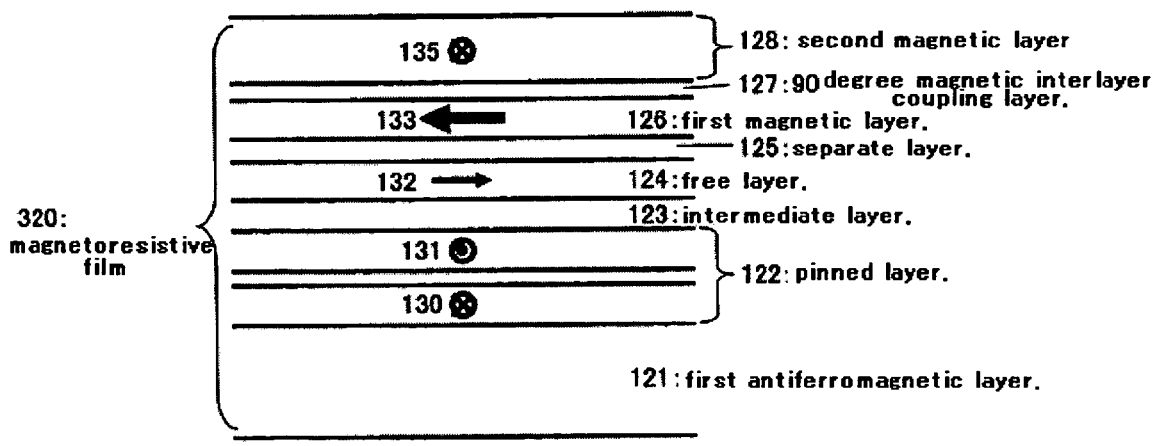
FIG. 10 is a schematic diagram illustrating an example of a magnetoresistive film used in the third embodiment of a magnetoresistive head of the present invention as seen from the air bearing surface.

FIG. 10 is a schematic diagram illustrating an example of a magnetoresistive film 320 of the embodiment 3 of the present invention as seen from the air bearing surface. It is a magnetoresistive head in which the magnetoresistive film 120 of the first embodiment of the present invention is only substituted by the magnetoresistive film 320, so that the detailed head configuration is omitted. This embodiment has a structure in which the second antiferromagnetic layer 129 is removed from a part of the system of applying a longitudinal biasing field of the first embodiment: separate layer 125/first ferromagnetic layer 126/90-degree magnetic interlayer coupling layer 127/second ferromagnetic layer 128/second antiferromagnetic layer 129, and in which the second ferromagnetic layer 128 consists of a hard magnetic material and the magnetic direction of the second ferromagnetic layer 128 is fixed in the direction along the sensor height. A material selected from Co—Pt and one in which Cr added therein can be used for the hard magnetic material.

In general, when using a hard magnetic material a domain structure of the hard magnetic material is transferred to the free layer 124, and a problem arises that the free layer 124 does not have excellent soft magnetic properties. However, as described in the present invention, the effects can be drastically reduced by interposing the separate layer 125/first ferromagnetic layer 126/90-degree magnetic interlayer coupling layer 127 between the free layer 124 and the second ferromagnetic layer 128 which consists of a hard magnetic material. Since the configuration and the principals of operation are the same as those of the embodiment 1 except for the second ferromagnetic layer 128/the second antiferromagnetic layer 129, a detailed explanation is omitted.

EMBODIMENT 4

Figure 11:
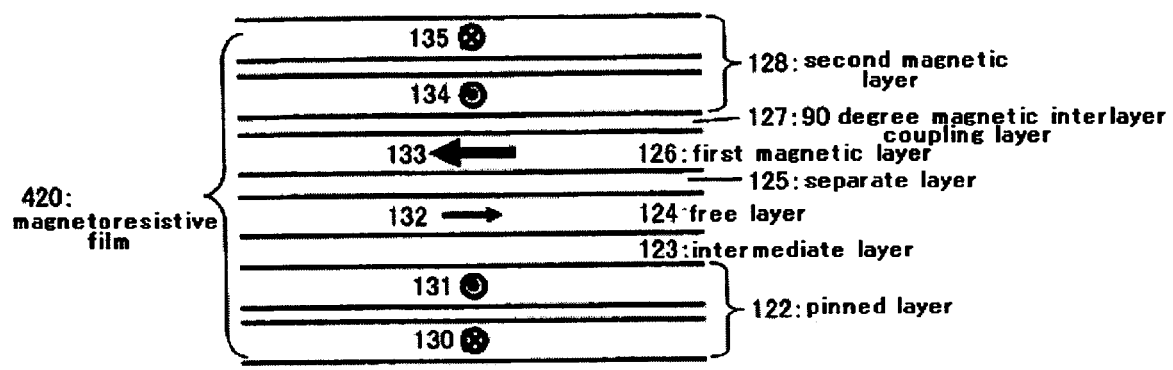
FIG. 11 is a schematic drawing illustrating an example of a magnetoresistive film used in the fourth embodiment of a magnetoresistive head of the present invention as seen from the air bearing surface.

In embodiments 1 to 3, a configuration was described in which the magnetization of the pinned layer 122 was fixed in the direction along the sensor height by an exchange coupling with the first antiferromagnetic layer 121 formed adjoining it. A mechanism to fix the magnetization direction of the pinned layer 122 is the same as that of the second ferromagnetic layer 128 described in the embodiments 2 and 3, in which the first antiferromagnetic layer 121 can be substituted by a self-pinned structure and a hard magnetic material. Since the details are the same as the second ferromagnetic layer 128 of the embodiments 2 and 3, a detailed explanation is omitted. Moreover, these configurations can be properly combined with any method for applying a longitudinal biasing magnetic field described in the embodiments 1 to 3. As one example, FIG. 11 is a schematic diagram illustrating an example of a magnetoresistive film 420 of the embodiment 4 of the present invention as seen from the air bearing surface, in which both the pinned layer 122 and the second ferromagnetic layer 128 have a self-pinned structure. It is a magnetoresistive head in which the magnetoresistive film 120 of the embodiment 1 of the present invention is only substituted by the magnetoresistive film 420, so that the detailed head configuration is omitted.

In the case when either of the first antiferromagnetic layer or the second antiferromagnetic layer is included as in the structure described in the embodiments 1 to 3, the magnetization directions of the pinned layer and the second ferromagnetic layer can be fixed nearly in the direction along the sensor height by in-field annealing while applying a magnetic field nearly in the direction along the sensor height. Moreover, in the case when neither the first ferromagnetic layer nor the second ferromagnetic layer is included as in the structure described in embodiment 4, the magnetization directions of the pinned layer and the second ferromagnetic layer can be fixed nearly in the direction along the sensor height by applying a static magnetic field nearly in the direction along the sensor height.

FIG. 12 illustrates a process flow paying attention to these longitudinal biasing methods. FIG. 12(A) illustrates a process flow in the case where at least either the first antiferromagnetic layer or the second antiferromagnetic layer is included. In this case, it includes (1) depositing a magnetoresistive film, (2) in-field annealing while applying a magnetic field nearly in the direction along the sensor height, and (3) sensor formation process (details are omitted). Moreover, FIG. 12(B) illustrates a process flow in the case when neither the first antiferromagnetic layer nor the second antiferromagnetic layer is included, and it includes processes of (1) depositing a magnetoresistive film, (2) applying a static magnetic field nearly in the direction along the sensor height, (3) sensor formation process (details are omitted), and (4) applying a static magnetic field nearly in the direction along the sensor height as required.

In still more detail, in the deposition process of the magnetoresistive film, it is preferable that uniaxial magnetic anisotropy be induced in the ferromagnetic film, which is a component of the magnetoresistive film, in a magnetic direction to be determined. Therefore, concretely, it is preferable that film deposition be carried out while applying a static magnetic field of about several kA/m nearly in the direction along the sensor height when the pinned layer and the second ferromagnetic layer are formed, and nearly in the direction along the track width when the free layer and the first ferromagnetic layer are formed. Moreover, the annealing spoken of in (A)-(2) means annealing in a temperature range necessary for the antiferromagnetic layer to apply an exchange coupling field to the ferromagnetic layer. Therefore, concretely, an annealing process in the temperature range of 200 to 300° C. for a time range of several minutes to several hours is applicable. Furthermore, it is preferable that the magnetic field applied during the annealing process be of a magnitude which is needed to magnetically saturate all ferromagnetic layers that are the structural elements of the magnetoresistive film; concretely, a magnetic field from several hundred kA/m to several MA/m may be applied. In (B)-(2), it is preferable that the static magnetic field be of a magnitude which is needed to magnetically saturate all the ferromagnetic layers which are the structural elements of the magnetoresistive film. The temperature of the environment during application of the static magnetic field is not particularly limited, and no problem arises if it is controlled to be 300° C. or less (preferably room temperature) from the viewpoint of the range where it does not affect the properties of the magnetoresistive film. Furthermore, in this case, because it is an objective that the magnetization direction of the ferromagnetic layer which is a structural element of the magnetoresistive film is provided by applying a static magnetic field, it is sufficient if the time for applying the static magnetic field is several seconds or more. Furthermore, in the case when neither first antiferromagnetic layer nor the second antiferromagnetic layer of (B) is included, if a problem arises such that the magnetization direction of the ferromagnetic layer which is a component of the magnetoresistive film is shifted from a desired direction during the (3) sensor formation process, it can be solved by adding a process for applying a static magnetic field, the same as in (B)-(2).

Therefore, according to the present invention, the magnetizations of the pinned layer and the second ferromagnetic layer can be easily fixed nearly in the direction along the sensor height, and, at the same time, the magnetization of the first ferromagnetic layer applying the longitudinal biasing field to the free layer can be automatically directed nearly in the direction along the track width. Moreover, because magnetic flux returns between the free layer and the first ferromagnetic layer at the track edges, the influence of the demagnetization field of the free layer at the track edges can be controlled.

EMBODIMENT 5

In the so-called current perpendicular-to-plane (CPP) magnetoresistive head, in which a sense current flows in the film thickness direction of the magnetoresistive film, a short-circuit occurs on the air bearing surface between the pinned layer and free layer because of the influence of smearing in the lapping process of the air bearing surface, thereby the yield may be reduced. In order to avoid this, it is preferable that a so-called "magnetic flux guide type" head structure be adopted. That is, it is a structure in which the pinned layer or the free layer is not exposed on the air baring surface and a short circuit of the sensor is prevented. In this structure, the configuration of the present invention can be flexibly applied as it is.

Figure 13:
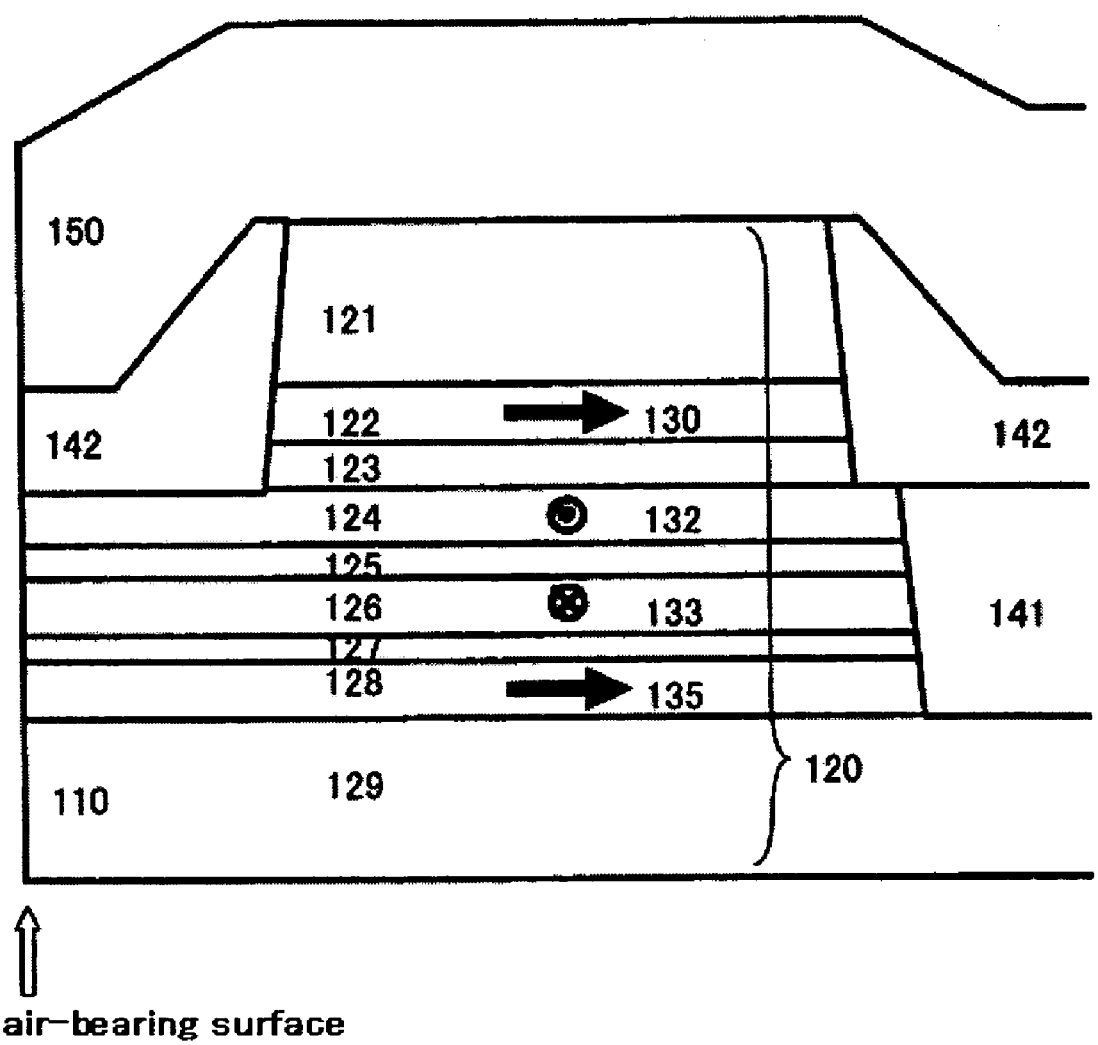
FIG. 13 is a cross-sectional drawing illustrating a sensor height direction of the fifth embodiment in which the present invention is applied to a magnetic flux guide type magnetoresistive head.

FIG. 13 illustrates a cross-section drawing of a sensor height direction at the track center in a magnetoresistive head of the embodiment 5 according to the present invention. A sequence of methods for fabricating a head will be described below. The embodiment 1 of the present invention is used as a basic structure. After forming a lower shield 110 on a substrate (not shown in the figure), a magnetoresistive film 120 is deposited. In this embodiment, it is preferable that the magnetoresistive film 120 includes the second antiferromagnetic layer 129/second ferromagnetic layer 128/90-degree magnetic interlayer coupling layer 127/first ferromagnetic layer 126/separate layer 125/free layer 124/intermediate layer 123/pinned layer 122/first antiferromagnetic layer 121, in which the pinned layer 122 is formed on the side far from the substrate, and that a part of the free layer 124, to which a longitudinal biasing field is applied in the direction along the track width, be used as a magnetic flux guide introducing the signal field by means of the first ferromagnetic layer 126/ separate layer 125. The magnetoresistive film 120 is patterned in a desired shape in the direction along the track width using photolithography, ion milling or reactive ion etching. Next, the insulator layer 140 is formed at both edge parts of the track width direction in the magnetoresistive film 120 by using a lift-off method (same as the embodiment 1 above).

The magnetoresistive film 120 is patterned in a desired shape in the direction along the sensor height using photolithography, ion milling or reactive ion etching, and the insulator layer 141 is formed by using a lift-off method. Moreover, it is patterned to a rather small dimension and in a desired shape in the direction along the sensor height using photolithography, ion milling or reactive ion etching. However, ion milling and reactive ion etching are carried out using equipment having an end-point detect function such as a mass spectrometer etc., thereby layers from the uppermost first antiferromagnetic layer 121 to the intermediate layer 123 are etched while the layers below the free layer 124 are left unetched. If it is in the range where the magnetic moment of the free layer 124 is not reduced to an extreme, it does not matter if the surface of the free layer 124 might be slightly over-etched. Moreover, in addition to the layers below the free layer 124, it does not matter if a part of the intermediate layer 123 might not be a milled shape. Next, the insulator layer 142 is formed using a lift-off method at both edges of the sensor height direction of the magnetoresistive layer 120. Finally, the upper shield 150 is formed, and the electrical resistivity change of the magnetoresistive film 120 is then detected by the lower shield 110 and the upper shield 150. As described in embodiment 1, the order of patterning the magnetoresistive film 120 may be exchanged between the track width direction and the sensor height direction.

As shown in FIG. 13, a preferable structure becomes one where the layers below the free layer 124 are left in the region opposite the air bearing surface as seen from the magnetoresistive film 120 and are made to function as a back magnetic flux guide, because the signal field is captured in the free layer more effectively. Because the detailed configuration of the magnetoresistive film 120 is the same as the one described above, it is omitted. It is necessary to pay attention that the magnetic flux guide itself does not become a source of noise in the magnetic flux guide type magnetoresistive head. In this embodiment, a part of the free layer 124, to which a longitudinal biasing field is applied in the direction along the track width, is used as a magnetic flux guide by the first ferromagnetic layer 126/separate layer 125, therefore, reproducing properties with high reliability can be obtained without generating noise. Furthermore, this structure has a great advantage for making the gap narrower between the upper and lower shields at the air bearing surface.

EMBODIMENT 6

Figure 14:
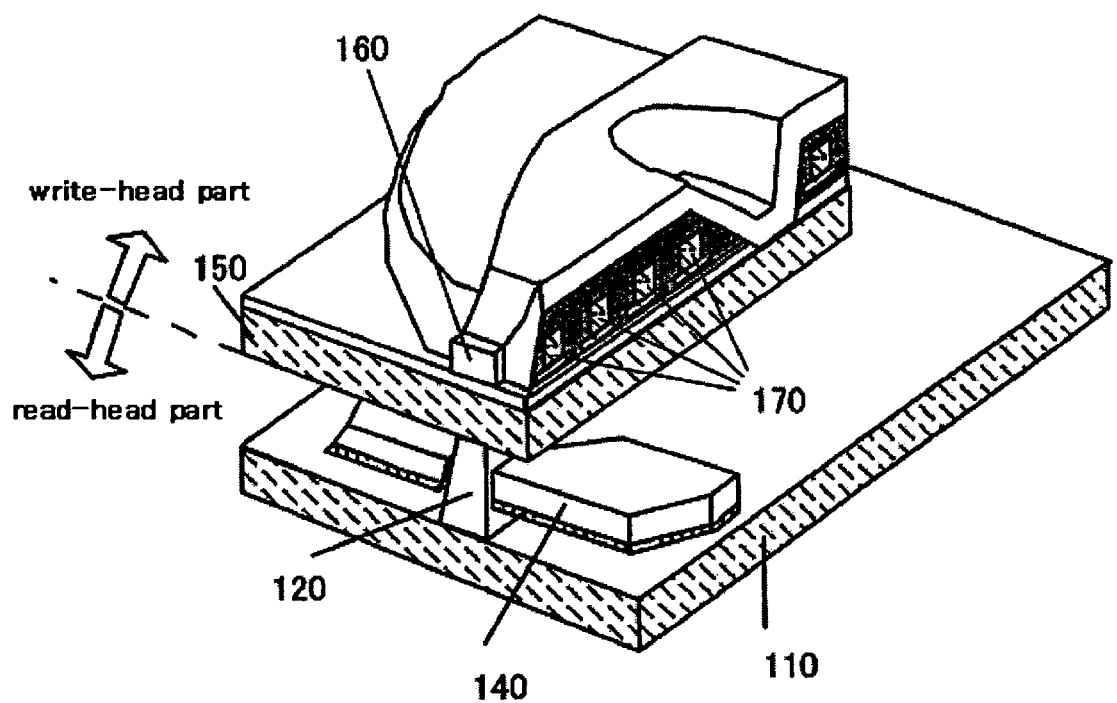
FIG. 14 is a schematic drawing illustrating an example of a write/read composite magnetoresistive head of the present invention.

FIG. 14 is a schematic drawing illustrating an example of a write/read composite magnetoresistive head of the present invention. Although the details are omitted, the figure illustrates a configuration in which a write head including mainly a magnetic pole 160 and a coil 170 is fabricated after fabricating a magnetoresistive head (read head) by the aforementioned method. The write head structure may be for longitudinal recording or perpendicular recording. There may be no problem even if a read head is first fabricated and a magnetoresistive head (read head) is formed thereon. After wafer processing is complete, information can be written to/read from the magnetic medium when it is incorporated into the magnetic recording system through the slitting process, the lapping process of air bearing surface, and the assembly process.

Figure 15:
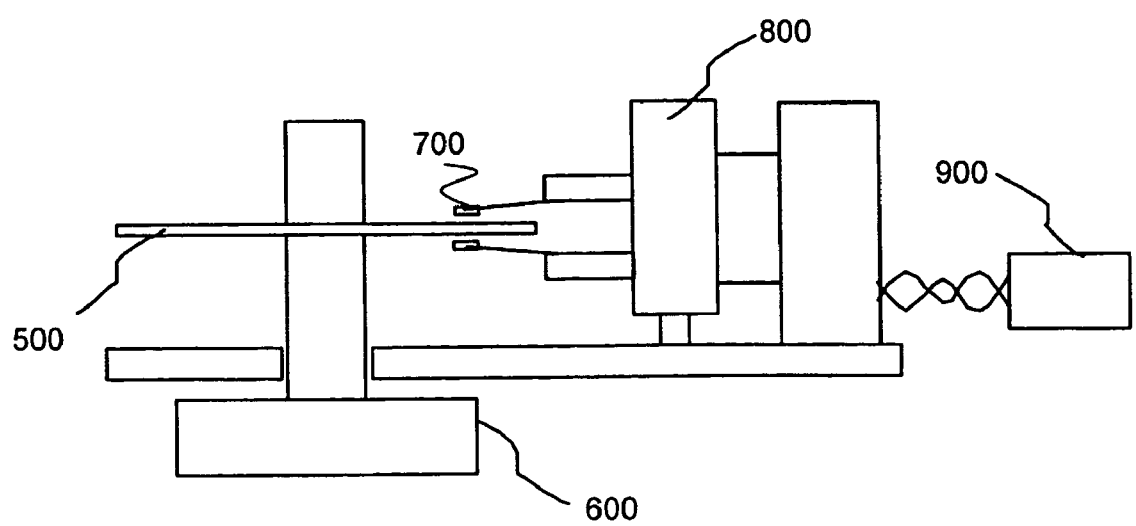
FIG. 15 is a schematic diagram illustrating an example of a magnetic recording system of the present invention.

FIG. 15 is a schematic diagram illustrating an example of a magnetic recording system of the present invention. A magnetic medium 500, in which information is magnetically recorded, is driven by rotation of a spindle motor 600, and a head slider 700 is introduced onto the track of the magnetic medium 500 by an actuator 800. That is, in the magnetic recording system, the read head and write head formed on the head slider 700 approaches a desired position on the magnetic medium 500 and moves relatively, and a signal is written/read in order. The recording signal is recorded in the magnetic medium 500 at the write head through a signal processing system 900; the magnetic signal recorded in the magnetic medium 500 is electromagnetically exchanged by the read head, and then the electric signal is obtained through the signal processing system 900. In order to transfer the head slider 700 onto a desired recording track of the magnetic medium 500, the positional signal on the track is detected by the read head and positioning is carried out by controlling the actuator 800. Assuming that the magnetic signal is recorded on both sides of the magnetic medium 500, the figure shows the case where two head sliders 700 are mounted, but, of course, the magnetic signal may be recorded on only one side of the magnetic medium 500. In this case, one head slider 700 is mounted. Moreover, although only one magnetic medium 500 is shown, there may be a plurality of magnetic recording media.

In the aforementioned magnetoresistive head of the present invention and a magnetic recording system wherein mounted, reproducing properties with high sensitivity and reliability can be obtained.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A current perpendicular-to-plane magnetoresistive head comprising:

a magnetoresistive film having a pinned layer in which a magnetization is fixed in a first direction, a free layer whose magnetization direction is changed by an external magnetic field, and an intermediate layer laminated between said pinned layer and said free layer;

a system of applying a longitudinal biasing magnetic field to make said free layer a single magnetic domain;

a pair of electrodes to flow a current to said magnetoresistive film, wherein, said system of applying a longitudinal biasing magnetic field includes a separate layer, a first ferromagnetic layer, a 90-degree magnetic interlayer coupling layer, and a second ferromagnetic layer whose magnetization is fixed in said first direction, laminated in order on the face of the side opposite to said intermediate layer and connected to said free layer, and said first ferromagnetic layer is interlayer-coupled to said second ferromagnetic layer in a nearly orthogonal direction through said 90-degree magnetic interlayer coupling layer and has a magnetization in a nearly orthogonal direction against the magnetization direction of said second ferromagnetic layer under a condition that an external magnetic field is zero.

2. The magnetoresistive head according to claim 1, wherein said first direction is nearly a direction along a sensor height; the magnetization of said pinned layer and said second ferromagnetic layer is fixed nearly in the direction along the sensor height; said first ferromagnetic layer has magnetization nearly in the direction along the track width under a condition that the external magnetic field is zero.

3. The magnetoresistive head according to claim 2, wherein said first ferromagnetic layer is coupled magnetostatically with said free layer at edges of the track width direction and, by returning a magnetic flux, a longitudinal biasing magnetic field is applied to said free layer in a second direction nearly parallel to the track width direction.

4. The magnetoresistive head according to claim 3, wherein said free layer and said first ferromagnetic layer are interlayer-coupled to each other antiferromagnetically through said separate layer, and a longitudinal biasing magnetic field is applied to said free layer in said second direction nearly parallel to the track width direction.

5. The magnetoresistive head according to claim 4, wherein said second ferromagnetic layer has at least two ferromagnetic layers and said at least two ferromagnetic layers are laminated through an antiferromagnetic coupling layer.

6. The magnetoresistive head according to claim 4, wherein said 90-degree magnetic interlayer coupling layer is composed of a material expressed by Mn—X (X is at least one element selected from the group consisting of Cr, Fe, Co, Ni, Ru, Rh, Pd, Re, Os, Ir, and Pt).

7. The magnetoresistive head according to claim 6, wherein said 90-degree magnetic interlayer coupling layer is composed of a Mn—Pt and has a thickness of about 1 nm or more and about 2.5 nm or less.

8. The magnetoresistive head according to claim 4, wherein said 90-degree magnetic interlayer coupling layer is composed of one selected from Cr and Mn.

9. The magnetoresistive head according to claim 4, wherein said 90-degree magnetic interlayer coupling layer is composed of an oxide film containing at least one element selected from the group consisting of Mg, Ca, Cr, Mn, Fe, and Co.

10. The magnetoresistive head according to claim 4, wherein the magnetization of said pinned layer is fixed nearly in the direction along the sensor height by exchange coupling with a first antiferromagnetic layer formed on the face of the side opposite to said intermediate layer and connected to said pinned layer; and the magnetization of said second ferromagnetic layer is fixed nearly in the direction along the sensor height by exchange coupling with a second antiferromagnetic layer formed on the face of the side opposite to said 90-degree magnetic interlayer coupling layer and connected to said second ferromagnetic layer.

11. The magnetoresistive head according to claim 4, wherein the magnetization of said pinned layer is fixed nearly in the direction along the sensor height by exchange coupling with a first antiferromagnetic layer formed on the face of the side opposite to said intermediate layer and connected to said pinned layer;

said second ferromagnetic layer has at least two ferromagnetic layers laminated through an antiferromagnetic coupling layer; and the magnetization of said second ferromagnetic layer is fixed nearly in the direction along the sensor height.

12. The magnetoresistive head according to claim 4, wherein the magnetization of said pinned layer is fixed nearly in the direction along the sensor height by exchange coupling with a first antiferromagnetic layer formed on the face of the side opposite to said intermediate layer and connected to said pinned layer;

said second ferromagnetic layer is composed of a hard magnetic material; and the magnetization of said second ferromagnetic layer is fixed nearly in the direction along the sensor height.

13. The magnetoresistive head according to claim 4, wherein said pinned layer has at least two ferromagnetic layers laminated through an antiferromagnetic coupling layer;

the magnetization of said pinned layer is fixed nearly in the direction along the sensor height; and the magnetization of said second ferromagnetic layer is fixed nearly in the direction along the sensor height by the magnetic exchange coupling with a second antiferromagnetic layer formed on the face of the side opposite to said 90-degree magnetic interlayer coupling layer and connected to said second ferromagnetic layer.

14. The magnetoresistive head according to claim 4, wherein said pinned layer has at least two ferromagnetic layers laminated through an antiferromagnetic coupling layer;

the magnetization of said pinned layer is fixed nearly in the direction along the sensor height;

said second ferromagnetic layer has at least two ferromagnetic layers laminated through an antiferromagnetic coupling layer; and the magnetization of said second ferromagnetic layer is fixed nearly in the direction along the sensor height.

15. The magnetoresistive head according to claim 4, wherein said pinned layer has at least two ferromagnetic layers laminated through an antiferromagnetic coupling layer;

the magnetization of said pinned layer is fixed nearly in the direction along the sensor height;

said second ferromagnetic layer is composed of a hard magnetic material; and the magnetization of said second ferromagnetic layer is fixed nearly in the direction along the sensor height.

* * * * *